(12) United States Patent
Jablokov et al.

(10) Patent No.: US 10,509,381 B2
(45) Date of Patent: Dec. 17, 2019

(54) MONITORING AND CONTROLLING OF APPLIANCES

(71) Applicant: WALLFLOWER LABS INC., Charlestown, MA (US)

(72) Inventors: Victor Roman Jablokov, Winchester, MA (US); Jesse St Marie, Woburn, MA (US); Iain McDonald, Revere, MA (US); Daniel Jay Kern, Cambridge, MA (US)

(73) Assignee: WALLFLOWER LABS, INC., Charlestown, MA (US)

( * ) Notice: Subject to any disclaimer, the term of this patent is extended or adjusted under 35 U.S.C. 154(b) by 0 days.

(21) Appl. No.: 16/040,003

(22) Filed: Jul. 19, 2018

(65) Prior Publication Data

US 2018/0321652 A1    Nov. 8, 2018

Related U.S. Application Data

(63) Continuation-in-part of application No. 15/291,514, filed on Oct. 12, 2016, now Pat. No. 10,061,288, which is a continuation-in-part of application No. 14/553,729, filed on Nov. 25, 2014, now Pat. No. 9,928,672.

(60) Provisional application No. 62/611,343, filed on Dec. 28, 2017, provisional application No. 62/242,047, filed on Oct. 15, 2015, provisional application No. 62/312,574, filed on Mar. 24, 2016, provisional application No. 61/912,415, filed on Dec. 5, 2013.

(51) Int. Cl.
*G05B 19/042* (2006.01)

(52) U.S. Cl.
CPC .... *G05B 19/042* (2013.01); *G05B 2219/2643* (2013.01)

(58) Field of Classification Search
CPC .................................................. G05B 19/042
USPC ........................................................ 340/5.61
See application file for complete search history.

(56) References Cited

U.S. PATENT DOCUMENTS

| | | | | |
|---|---|---|---|---|
| 5,608,378 A * | 3/1997 | McLean | ................. | G08B 21/24 219/445.1 |
| 5,945,017 A * | 8/1999 | Cheng | .................... | F23D 14/76 219/446.1 |
| 8,875,691 B1 * | 11/2014 | Saint Joy | ................ | A47J 37/00 126/198 |
| 2006/0202848 A1 * | 9/2006 | Volodarsky | ............. | F24C 7/082 340/654 |
| 2007/0175888 A1 * | 8/2007 | Wash | .................... | F24C 15/106 219/448.12 |
| 2009/0017404 A1 * | 1/2009 | White | ....................... | F24C 3/12 431/12 |

\* cited by examiner

*Primary Examiner* — Emily C Terrell
(74) *Attorney, Agent, or Firm* — Pierce Atwood LLP

(57) ABSTRACT

An electric or gas range may be monitored or controlled with an integrated appliance assistant. The range may include multiple sensors, such as sensors measuring temperature proximate to a burner, power usage by the burner (e.g., electricity or gas consumption), temperature proximate to an oven, or power usage by the oven. The measurements received from the sensors may be processed by a control board, and the control board may be configured to turn off a burner and/or the oven based on the measurements. Such an electric or gas range may provide increased safety by turning off a burner or the oven in the event of a fire or a person accidentally leaving it on.

12 Claims, 17 Drawing Sheets

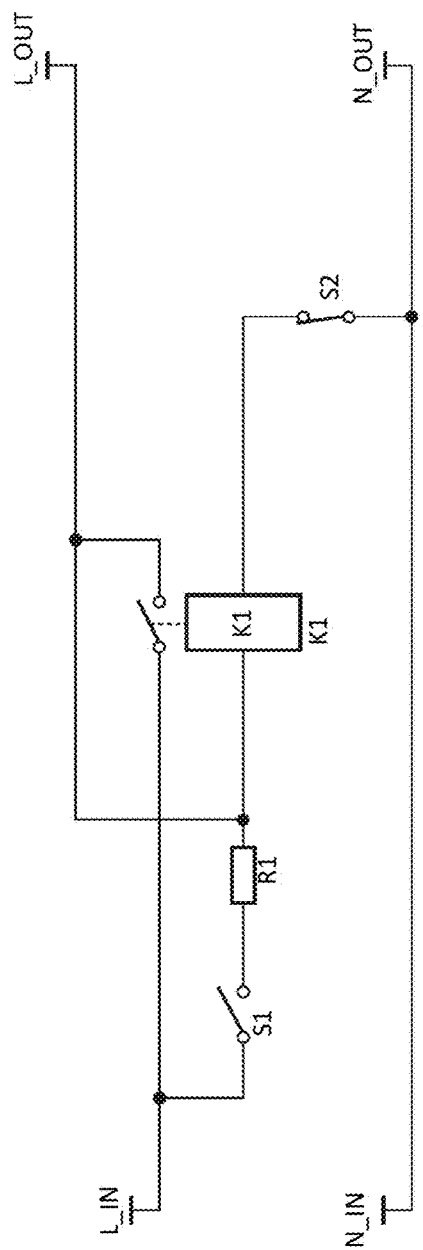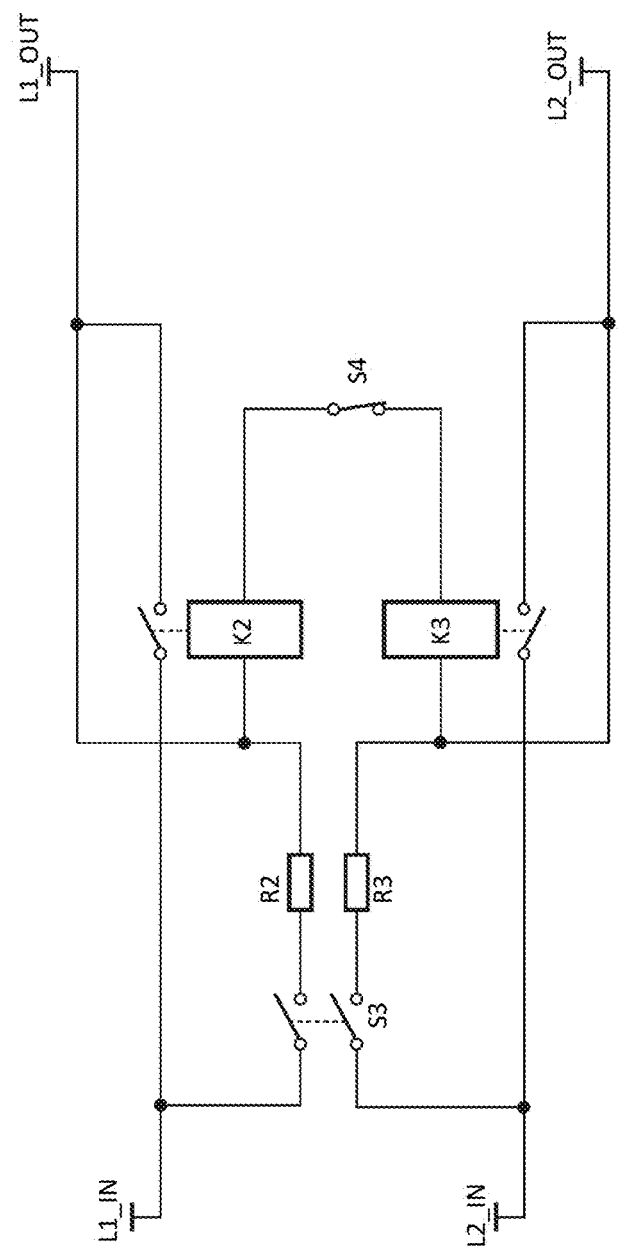
Fig. 7A
Fig. 7B

MONITORING AND CONTROLLING OF APPLIANCES

CROSS-REFERENCES TO RELATED APPLICATIONS

This application is a continuation-in-part of and claims the benefit of U.S. patent application Ser. No. 15/291,514, titled "Monitoring and Controlling of Appliances," and filed on Oct. 12, 2016. This application claims priority to and claims the benefit of U.S. Provisional Patent Application No. 62/611,343 filed on Dec. 28, 2017.

U.S. patent application Ser. No. 15/291,514 is a continuation-in-part of and claims the benefit of U.S. patent application Ser. No. 14/553,729, titled "System and method of monitoring and controlling appliances and powered devices using radio-enabled proximity sensing," filed on Nov. 25, 2014, and now issued as U.S. Pat. No. 9,928,672. U.S. patent application Ser. No. 15/291,514 claims priority to and claims the benefit of U.S. Provisional Patent Application No. 62/242,047 filed on Oct. 15, 2015 and U.S. Provisional Patent Application No. 62/312,574 filed on Mar. 24, 2016.

U.S. patent application Ser. No. 14/553,729 claims priority to and claims the benefit of U.S. Provisional Patent Application No. 61/912,415 filed on Dec. 5, 2013.

U.S. patent application Ser. No. 15/291,514; U.S. Pat. No. 9,928,672; U.S. Provisional Patent Application No. 62/611,343; U.S. Provisional Patent Application No. 61/912,415; U.S. Provisional Patent Application No. 62/242,047; and U.S. Provisional Patent Application No. 62/312,574 are each hereby incorporated by reference in their entireties for all purposes.

BACKGROUND

Conventional appliances, such as stoves, ovens, and refrigerators, may not be connected to a network and their operation may not depend on the presence of people in the vicinity of the appliance. For example, a stove may continue to operate when no one is home, and a person not at home may not know which appliances are on and which appliances are off. Additional convenience, safety, and functionality of conventional appliances may be improved by connecting the appliances to a network and/or using information external to the appliance in controlling the operation of the appliance.

BRIEF DESCRIPTION OF THE FIGURES

The invention and the following detailed description of certain embodiments thereof may be understood by reference to the following figures:

FIGS. 7A, 7B, and 7C are example circuits to allow remote enablement of an appliance.

DETAILED DESCRIPTION

Described herein are techniques for improving the operation and functionality of an appliance using an appliance assistant. An appliance assistant is any hardware and/or software that may be used with an appliance to improve the operation and/or functionality of the appliance. The appliance assistant may be external to an appliance, may be added internally to an existing appliance, or may be included in an appliance during the manufacture of the appliance. As used herein, appliance refers broadly to any powered device that may be used in a home. For example, an appliance may include a refrigerator, range, stove, oven, dishwasher, clothes washer, dryer, air conditioner, curling iron, hair straightener, television, or personal computer.

The appliance assistants described herein may include any of the components or features described in U.S. patent application Ser. No. 14/553,729, U.S. Provisional Patent Application No. 61/912,415, U.S. Provisional Patent Application No. 62/242,047, and U.S. Provisional Patent Application No. 62/312,574, which are each hereby incorporated by reference in their entireties. For example, the appliance assistants described herein may include any components or features of a monitor and control module described in the incorporated patent applications.

Appliance Assistant

Figure 1A:
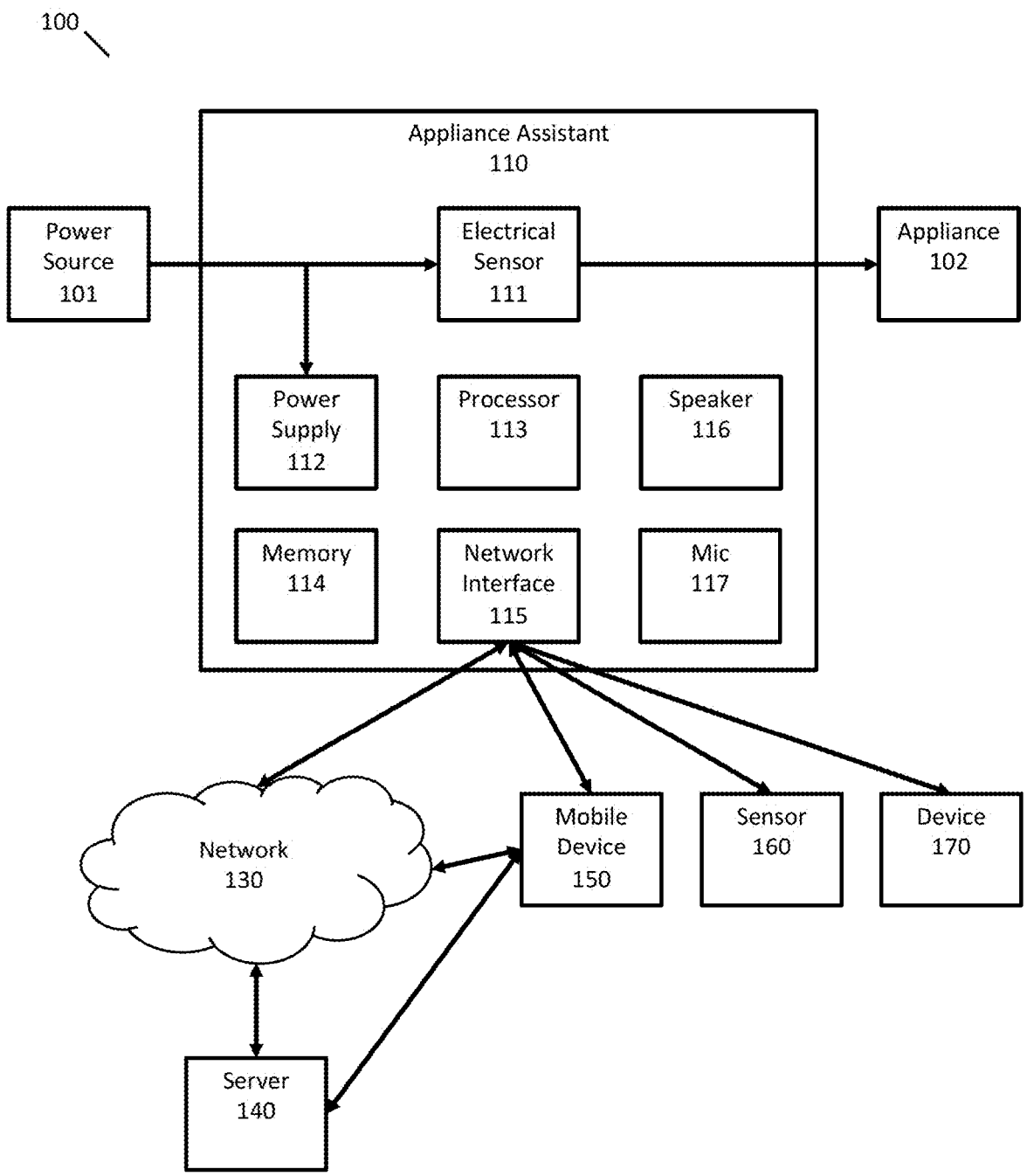
FIG. 1A is an example of a system for using an appliance assistant in conjunction with an appliance.

FIG. 1A illustrates an exemplary system 100 for using an appliance assistant 110 in conjunction with an appliance 102. In FIG. 1A, appliance assistant 110 is connected to power source 101 and appliance 102. Power source 101 may include any source of power to an appliance, such as an electrical outlet or a battery. Electricity from power source 101 may travel through appliance assistant 110 before reaching appliance 102.

Figure 1B:
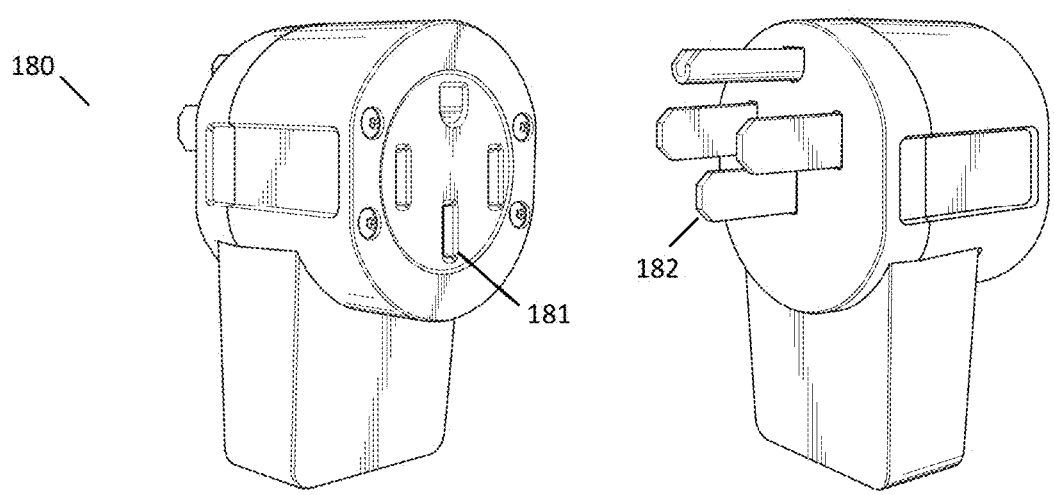
FIGS. 1B, 1C, and 1D are example implementations of an appliance assistant.
Figure 1C:
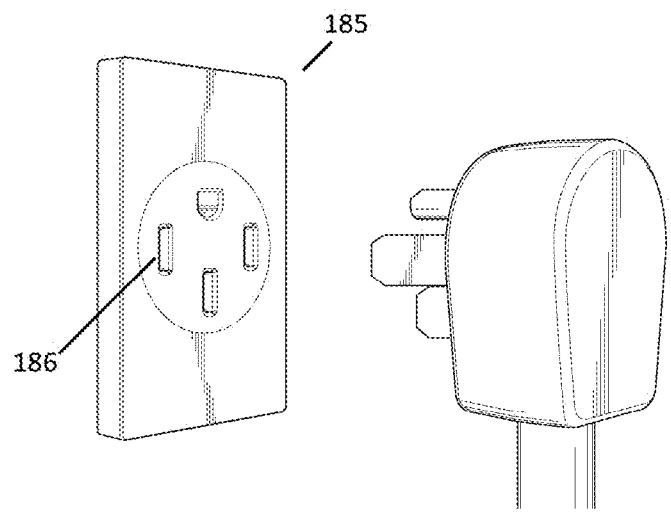
Figure 1D:
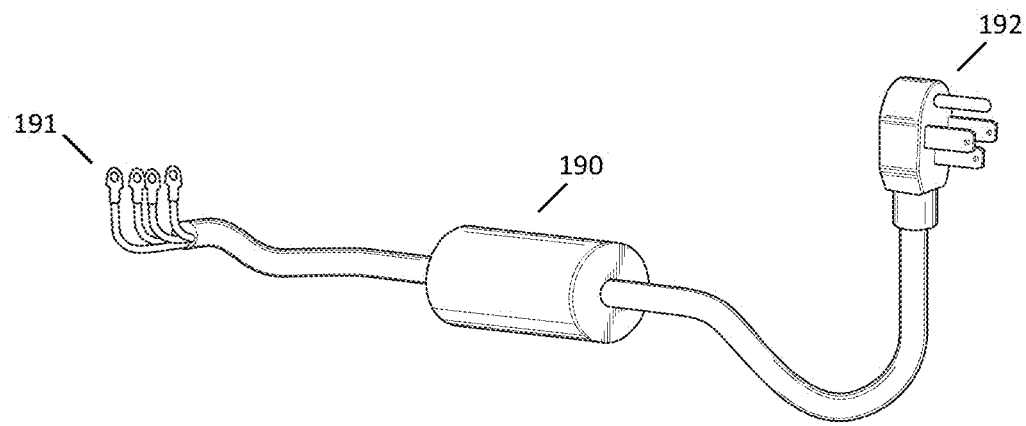

Appliance assistant 110 may be implemented in a variety of formats as shown in FIGS. 1B, 1C, and 1D. In FIG. 1B, appliance assistant 110 takes the form of a plug 180. Plug 180 may have an input receptacle 181 to allow appliance 102 to plug into plug 180. Plug 180 may also have prongs 182 to allow plug 180 to plug into an electrical outlet. Plug 180 is shown in FIG. 1B with an input receptacle for four prongs and four prongs for plugging into an electrical outlet, such as may be found on a stove, oven, or range. Plug 180 may also be created for a different number of prongs, such as two, three, four, or more. Plug 180 may also be created for different configurations of electrical plugs and outlets as found in different countries around the world.

In FIG. 1C, appliance assistant 110 takes the form of an electrical outlet 185. Electrical outlet 185 may replace a conventional electrical outlet. Electrical outlet 185 may be connected to the electrical wires of a house to receive power. Electrical outlet 185 may have an input receptacle 186 to allow appliance 102 to plug into electrical outlet 185. Electrical outlet 185 may also be created for different numbers and configurations of prongs.

In FIG. 1D, appliance assistant 110 takes the form of a power cord 190. Power cord 190 may replace a conventional power cord for an appliance. An appliance end 191 of power cord 190 may connect to appliance 102, such as by attaching wires of appliance end 191 to terminals of appliance 102. A power source end 192 of power cord 190 may be attached to a power source, such as by plugging it into an electrical outlet.

In some implementations, appliance assistant 110 may be placed in a location such that it is not visible to people who use the appliance. For example, where the appliance is an electric range, the appliance assistant may be located behind the range and may not be visible to people using the range.

Regardless of the form, appliance assistant 110 may pass through electricity to appliance 102. Appliance assistant 110 may be able to monitor the electricity usage of appliance 102 using electrical sensor 111. Electrical sensor 111 may be any sensor that monitors a property of electrical usage, such as a current sensor or a voltage sensor. Appliance assistant 110 may monitor the electrical usage of appliance 102 to provide additional functionality and/or safety regarding the usage of appliance 102 as described in greater detail below.

Appliance assistant may include other components to assist in providing additional functionality or safety, such as any components typical of a computing device. Appliance assistant 110 may include a power supply 112 to power other components of appliance assistant. For example, power source 101 may provide AC power, but components of appliance assistant 110 may require DC power, and power supply may convert the AC power to DC power.

Appliance assistant 110 may include one or more of a processor 113. Processor 113 may take any suitable form, such as a central processing unit, a microprocessor, an integrated circuit, an application-specific integrated circuit, or a field-programmable gate array. Processor 113 may interact with other components of appliance assistant to provide desired functionality. For example, processor 113 may receive sensor readings from electrical sensor 111 to determine when appliance 102 is on or off.

Appliance assistant 110 may include memory 114. Memory 114 may include any form of data storage, such as volatile or nonvolatile memory (e.g., RAM, ROM, or flash).

Appliance assistant 110 may include one or more of a network interface 115 to interact with other devices. Network interface 115 may be wired or wireless and may use any network protocols, such as personal area networks (e.g., Bluetooth), local area networks (e.g., Wi-Fi), or wide area networks (e.g., cellular networks).

Appliance assistant 110 may have any type of input components and output components. For example, appliance assistant may include microphones, cameras, displays, LEDs, keyboards, buttons, touch screens, motion sensors, or temperature sensors.

In some implementations, appliance assistant 110 may have limited input and output components. As used herein, the term human input component includes any components that allows a person to provide input directly to a device. For example, human input components include buttons, touch screens, keyboards, finger print sensors, microphones, and cameras. A network interface is not a human input component because a person cannot provide input to a device via a network interface. As used herein, the term human output component includes any components that allows a person to receive output directly from a device. For example, human output components include LED lights, displays, and speakers. A network interface is not a human output component because a person cannot receive output from a device via a network interface.

In some implementations, appliance assistant 110 may not have any human input components and may not have any human output components. For example, where appliance assistant 110 is located in a place that is not visible or accessible to people, human input components and human output components may not be needed. In some implementations, appliance assistant 110 may have human input components but may not have any human output components. In some implementations, appliance assistant 110 may have human output components but may not have any human input components. In some implementations, speaker 116 may be the only human output component. In some implementations, microphone 117 may be the only human input component. Appliance assistant 110 may have any combination of the above human input components and human output components. For example, appliance assistant 110 may not have any human output components and may have only microphone 117 for a human input component.

Appliance assistant 110 may also include a variety of components or modules providing specific functionality, and these components or modules may be implemented in software, hardware, or a combination thereof.

Appliance assistant 110 may interact with other devices using network interface 115. In some implementations, appliance assistant 110 may interact directly with other devices in its vicinity. For example, appliance assistant 110 may scan for the presence of nearby devices, such as mobile device 150. The operation of appliance assistant 110 may depend on the presence of nearby devices, as described in greater detail below, such as by sending a notification if no mobile device is nearby when appliance 102 is in an on state. A notification may be provided using any appropriate techniques, including but not limited to sending a text message to a user, sending an email message to a user, a push message, causing a mobile device (e.g., smart phone) to present a notification (e.g., a visual or audible notification presented by an application), or causing speaker 116 of appliance assistant 110 to play a sound (e.g., an alarm or computer generated speech).

Appliance assistant 110 may interact with other sensors, such as sensor 160. For example, sensor 160 may be a temperature sensor or a motion sensor. The operation of appliance assistant 110 may depend on data received from sensor 160, as explained in greater detail below.

Appliance assistant 110 may interact with any other type of device with a network connection, such as device 170. Device 170 may include Internet-of-things devices with a network connection, such as lights, locks, or smoke alarms. The operation of appliance assistant 110 may depend on data received from device 170 and appliance assistant 110 may be able to control device 170, as explained in greater detail below.

In some implementations, appliance assistant 110 may be connected to a network 130, such as a personal area network, a local area network, a wide area network, or the Internet. Appliance assistant 110 may communicate with any of mobile device 150, sensor 160, or device 170 using network 130 instead of or in addition to communicating with them directly.

Appliance assistant 110 may communicate with server 140 via network 130. Server 140 may assist in implementing the operations of appliance assistant 110. For example, appliance assistant 110 may send a notification to mobile device 150 via server 140, or appliance assistant 110 may obtain information from server 140, such as information about people who live in the house.

Appliance assistant 110 may perform a variety of actions, such as the following.

Appliance assistant 110 may perform geo-fencing techniques to determine if users are in the vicinity of the appliance, which users are in the vicinity of the appliance, and/or when users enter or leave the vicinity of the appliance. Any appropriate techniques may be used for geo-fencing, including but not limited to the following.

In some implementations, appliance assistant 110 may use motion sensors or video cameras to determine if users are in the vicinity of the appliance. As described in greater detail below, appliance assistant may communicate with sensor 160 and device 170 to obtain information from them, and these may include a motion sensor or video camera. For example, motion data from a motion sensor may be used to determine if a person is present. Algorithms may be used to distinguish motion of people from other motion, such as pets. Facial and/or body recognition techniques may be used to process video from a video camera and determine if a person is present in the video.

In some implementations, appliance assistant 110 may use network interface 115 to perform geo-fencing. Network interface 115 may listen for wireless signals from other devices in the vicinity of appliance assistant 110. For example, mobile device 150 may transmit a MAC ID or another identifier. A received signal strength indicator (RSSI) or triangulation techniques may also be used to determine a distance or location of mobile device 150 relative to appliance 102. In some implementations, appliance assistant 110 may have access to a list of identifiers of mobile devices of people who are authorized to use appliance 102, and this list of identifiers may be stored on appliance assistant 110 or stored in another location, such as server 140. For example, the list of authorized identifiers may include identifiers of mobile devices of all people who live in the house or all adults who live in the house.

In some implementations, appliance assistant 110 may use microphone 117 to perform geo-fencing. An application on a mobile device can play a sound that can be captured by a microphone of appliance assistant. For example, the mobile device may play the sound periodically, such as once every 5 minutes. If appliance assistant 110 receives the sound via microphone 117, then the mobile device is in the vicinity of appliance 102. Any suitable sound may be played by the mobile device, such as a chirp, sequence of tones, or a sound with frequencies higher than what can be heard by people.

In some implementations, geo-fencing may be performed by having mobile devices determine if the mobile devices are in the vicinity of appliance assistant 110. For example, a mobile device may listen for a wireless signal from appliance assistant 110 to determine if the mobile device is in the vicinity of appliance assistant, or mobile device may use a microphone to receive audio signals generated by appliance assistant 110.

In some implementations, a mobile device may perform geo-fencing using sensors of the mobile device that allow the mobile device to determine its location. Any appropriate techniques may be used to allow the mobile device to determine its location, such as using a global positioning system sensor, using a network interface that communicates with cell towers (e.g., cell tower triangulation), or using a network interface that communicates over a wireless local area network (e.g., Wi-Fi) and using identifiers of nearby devices and a database of device locations. In some implementations, the mobile device may then compare its location with a known location of the appliance to determine if the mobile device is in the vicinity of the appliance. In some implementations, the mobile device may transmit its location to another location, such as a server computer or appliance assistant, and the other location may compare the location of the mobile device with a known location of the appliance to determine if the mobile device is in the vicinity of the appliance.

Appliance assistant 110 may send notifications to users relating to the operation of appliance 102. For example, appliance assistant 110 may send a notification for any of the following events: appliance 102 is turned on; appliance 102 is turned off; or appliance 102 has been on for longer than a specified period of time (e.g., setting a timer when appliance 102 is turned on and sending the notification at the expiration of the timer). Notifications may be sent using any appropriate techniques, such as email, text message, or push message. The recipients of the notifications may be specified by the owner of the house or another person with the authority to configure appliance assistant 110. For example, notifications may be sent to everyone living in the house or only to the adults. A person configuring appliance assistant 110, may specify a list of users who are able to receive notifications (e.g., by user ID, email address, or mobile device ID), may specify the notifications received by each user, and may allow individual users to customize their own notifications. The configuration information may be stored on appliance assistant or on a server.

Appliance assistant 110 may use geo-fencing techniques in determining when to send notifications. Appliance assistant 110 may any of the techniques described herein to determine if any mobile devices are in the vicinity of appliance 102. The absence of mobile devices or identifiers of nearby mobile devices may be used when determining to send notifications. In some implementations, appliance assistant will have access to a list of identifiers of mobile devices of people who are authorized to use appliance 102, and this list of identifiers may be stored on appliance assistant 110 or stored in another location, such as server 140. For example, the list of authorized identifiers may include identifiers of mobile devices of all people who live in the house or all adults who live in the house.

In some implementations, any of the notifications described herein may only be sent when no mobile devices are near appliance 102 (e.g., no authorized mobile devices are detectable or within a specified distance as determined by RSSI) or when specific mobile devices are not near appliance 102 (e.g., no adults are near). In some implementations, notifications may be sent based on a mobile device entering or leaving the vicinity of appliance 102. For example, when appliance 102 is turned on, a mobile device may be near appliance 102 and that mobile device may later leave the vicinity of appliance 102. A notification may be sent when the mobile device leaves the vicinity of appliance 102; after a threshold of time after the mobile device leaves the vicinity of appliance 102 (e.g., setting a timer when the mobile device leaves the vicinity and sending the notification upon the expiration of the timer); or a mobile device entering the vicinity of appliance 102.

Appliance assistant 110 may communicate with sensor 160 in determining when to send notifications. Sensor 160 may be any type of sensor, such as a motion sensor, temperature sensor, carbon monoxide detector, hazardous gas detector, smoke detector, or flame detector. In some implementations, appliance assistant 110 may send a notification in response to sensor 160 sending a notification to appliance assistant 110 that an event has occurred (e.g., using a REST API). For example, a temperature sensor may send a notification that a temperature has exceeded a threshold, a smoke detector may send a notification that smoke has been detected, or a flame sensor may send a notification that flame has been detected. Appliance assistant 110 may send a notification to one or more users after receiving the notification from sensor 160. In some implementations, data received from sensor 160 may be used to send any of the notifications described herein.

Appliance assistant 110 may communicate with device 170 to send notifications or to improve the functionality of either appliance assistant 110 or device 170. As noted above, device 170 may be any type of device with a network connection, such as Internet-of-things devices (e.g., lights, locks, or smoke alarms with a network connection). In some implementations, device 170 may control the operation of appliance assistant 110. For example, where device 170 is a smoke alarm with a network connection, the smoke alarm may detect smoke and send a message (e.g., using a REST API) to appliance assistant 110 to turn off appliance assistant 110 (e.g., where the appliance is a stove). In some implementations, appliance assistant 110 may control the operation of device 170. For example, where device 170 is a thermostat with a network connection, appliance assistant 110 may send a message to device 170 to turn down the heat in response to operation of appliance 102 (e.g., the appliance is an oven and cooking has commenced). In some implementations, appliance assistant 110 may send a notification in response to a message received from device 170. For example, where device 170 is a smoke alarm, appliance assistant 110 may send a notification to a user (e.g., email or text message) in response to receiving a message from the smoke alarm that smoke has been detected.

Appliance assistant 110 may listen for sounds in its environment using microphone 117 and send notifications based on the received sounds. For example, appliance assistant 110 may detect the sound of a smoke alarm by processing an audio signal received at microphone 117, and send a notification to a user in response to detecting the sound of the smoke alarm.

A user may obtain information about appliance 102 from a mobile device. For example, an application running on the mobile device may allow the user to interact with appliance assistant 110 (e.g., via server 140 and/or network 130). The user may be able to obtain information, such as whether appliance 102 is on or off; how long appliance 102 has been on or off; a history of usage of appliance 102 (e.g., durations and/or start and end times); a number of times that appliance 102 was used over a time period; mobile devices currently or previously in the vicinity of appliance 102; a history of notifications send by appliance assistant 102.

A user may control operation of appliance assistant 110 from a mobile device. For example, a user may effectively turn off appliance assistant 110 so that it stops providing some or all of the technology described herein. A user may change a list of authorized users. A user may reset or increase the amount of time on any of the timers described herein. For example, a user may be cooking and need to run an errand. The user may change a default timer (e.g., 5 minutes) with a longer timer (e.g., 30 minutes) so that the user may complete the errand without appliance assistant sending notifications regarding the absence of a mobile device in the vicinity of appliance 102. An appliance assistant 110 or a server working in conjunction with appliance assistant 110 may be configured to provide different permission levels to different users via their mobile devices. For example, some users may not be able receive information from or control appliance assistant 110 from a mobile device, some users may only be able to receive information on their mobile device, and some users may be able to both receive information and control or configure appliance assistant 110 from their mobile devices.

Appliance assistant 110 may have multiple timers that may be controlled by a user. In some implementations, the user may control the timers from an application on a user device, such as a mobile device. For example, appliance assistant 110 may have a manual timer that is set by a user, similar to a timer that appears on a stove. A user may set the timer to an amount of time (e.g. 10 minutes), start and stop the manual timer, or add time to the timer. When the manual timer expires, the user may receive a notification. For example, the manual timer may be used when cooking, such as timing the cooking of pasta.

Appliance assistant 110 may have a safety timer that starts when the appliance is turned on. The safety timer may have a default setting for the appliance or a default setting for a user. For example, the safety timer for a stove may be 20 minutes for adults in the house but 5 minutes for kids in the house. A user may set the timer to an amount of time (e.g. to override the default), start and stop the safety timer, or add time to the timer. When the safety timer expires, the user may receive a notification. For example, the safety timer may warn users that they forget to turn off an appliance (e.g., a curling iron).

Appliance assistant 110 may have an unattended timer that starts when the appliance is left unattended. Whether an appliance is left unattended may be determined using any of the techniques described herein. For example, geo-fencing techniques (e.g., detecting signals from mobile devices) or sensor 160 (e.g., a motion sensor) may be used to determine if an appliance is unattended. The unattended timer may have a default setting for the appliance or a default setting for a user (such as the last user who was near the appliance). For example, the unattended timer may be longer for adults than for children. A user may set the timer to an amount of time (e.g. to override the default), start and stop the timer, or add time to the timer. When the unattended timer expires, the user may receive a notification. In some implementations, the unattended timer may automatically reset when a user is detected near the appliance. For example, the unattended timer may be set to 5 minutes and may automatically start when a user leaves the vicinity of the appliance. The user may be gone for two minutes, and the unattended timer may count down to 3 minutes while the user is gone. When the user returns, the timer may be reset to 5 minutes and be stopped until the appliance is again unattended. In some implementations, the unattended timer may have adaptive thresholds or parameters relating to typical usage of the appliance that may be learned by monitoring usage of the appliance as described in greater detail below.

In some implementations, the operation of a timer may depend on another timer. For example, a user may set a manual timer to one hour because the user would like to use the appliance for an extended period of time (e.g., cooking a roast in an oven). The default safety timer for the appliance may be 20 minutes, but because the manual timer has been set to a longer time period than the safety timer, the safety timer may be disabled or set to a longer time period (e.g., the sum of the manual and safety timers or one hour and 20 minutes for the above example). In some implementations, the unattended timer may similarly be disabled or set to a longer time period when the manual timer has been set.

Appliance assistant 110 may also be used with appliances that are powered by means other than electricity (or in addition to electricity), such as appliances powered by fuel (e.g., natural gas or propane). For example, power source 101 may be a supply of natural gas and electrical sensor 111 may be replaced with a sensor that detects the flow of natural gas (e.g., a flow sensor). In some implementations, an appliance assistant 100 for appliances powered by fuel may need a source of electrical power to power the appliance assistant. Accordingly, such an appliance assistant may receive electrical power to power the appliance assistant and may determine a flow of fuel to the appliance using a fuel flow sensor. In some implementations, appliance assistant 110 may have sensors for multiple power sources (e.g., electrical power and natural gas) and may perform the above operations in parallel for both power sources. The techniques described above for electrical appliances may also be applied to appliances powered by other means using techniques known to one of skill in the art.

In some implementations, an appliance assistant may have features as described in the following clauses, combinations of any two or more of them, or in combination with other clauses presented herein.

1. An appliance assistant connected to a power source and an appliance, the appliance assistant comprising:
   an electrical sensor, wherein the electrical sensor measures electricity provided to the appliance;
   a network interface, wherein the network interface is configured to receive wireless signals from mobile devices in the vicinity of the appliance;
   a processor configured to:
      determine an operating state of the appliance,
      obtain identifiers from mobile devices in the vicinity of the appliance by processing wireless signals received at the network interface,
      set a timer based on the obtained identifiers or the absence of obtained identifiers,
      in response to the expiration of the timer, (i) play a sound from a speaker of the appliance assistant or (ii) send a notification to a user device;
   wherein the appliance assistant does not include human input devices.
2. The appliance assistant of clause 1, wherein the processor is configured to:
   start a second timer in response to determining that the appliance is consuming electricity; and
   send a second notification to a user device in response to the expiration of the second timer.
3. The appliance assistant of clause 1, wherein the processor is configured to send a notification to the user device in response to the appliance changing from an off state to an on state.
4. The appliance assistant of clause 1, wherein the processor is configured to set a timer based on the obtained identifiers or the absence of obtained identifiers by comparing the obtained identifiers to one or more stored identifiers.
5. The appliance assistant of clause 1, wherein the appliance assistant is configured to be placed behind the appliance so that it is not visible to users of the appliance.
6. The appliance assistant of clause 1, wherein the appliance assistant (i) is an electrical outlet installed in a wall, (ii) includes a plug to be inserted into an electrical outlet and a receptacle to receive a plug of the appliance, or (iii) replaces an electrical cord of the appliance.
7. The appliance assistant of clause 1, wherein the processor is configured to:
   receive a request from the user device for information about the appliance; and
   transmit to the user device the requested information.
8. The appliance assistant of clause 1, wherein the device does not include human output devices.
9. The appliance assistant of clause 1, wherein the appliance assistant includes a speaker, and wherein the processor is configured to play a sound from the speaker (i) based on the obtained identifiers or the absence of obtained identifiers or (ii) in response to the expiration of the timer.
10. The appliance assistant of clause 1, wherein the appliance assistant is integrated into the appliance.
11. A system comprising the appliance assistant of any of clauses 1-10, an appliance, and a user device.
12. A method for notifying a user, the method implemented by an appliance assistant, wherein the appliance assistant does not include human input devices, the method comprising:
   determining an operating state of an appliance;
   obtaining identifiers from mobile devices in the vicinity of the appliance by processing wireless signals received at the network interface;
   setting a timer based on the obtained identifiers or the absence of obtained identifiers; and
   in response to the expiration of the timer, (i) playing a sound from a speaker of the appliance assistant or (ii) sending a notification to a user device.
13. The method of clause 12, comprising the appliance assistant of any of clauses 1-10.
14. An appliance assistant connected to a fuel source and an appliance, the appliance assistant comprising:
   an fuel sensor, wherein the fuel sensor measures a flow of fuel provided to the appliance;
   a network interface, wherein the network interface is configured to receive wireless signals from mobile devices in the vicinity of the appliance;
   a processor configured to:
      determine an operating state of the appliance,
      obtain identifiers from mobile devices in the vicinity of the appliance by processing wireless signals received at the network interface,
      set a timer based on the obtained identifiers or the absence of obtained identifiers,
      in response to the expiration of the timer, (i) play a sound from a speaker of the appliance assistant or (ii) send a notification to a user device;
   wherein the appliance assistant does not include human input devices.

Appliance Assistant with Relay

Figure 2:
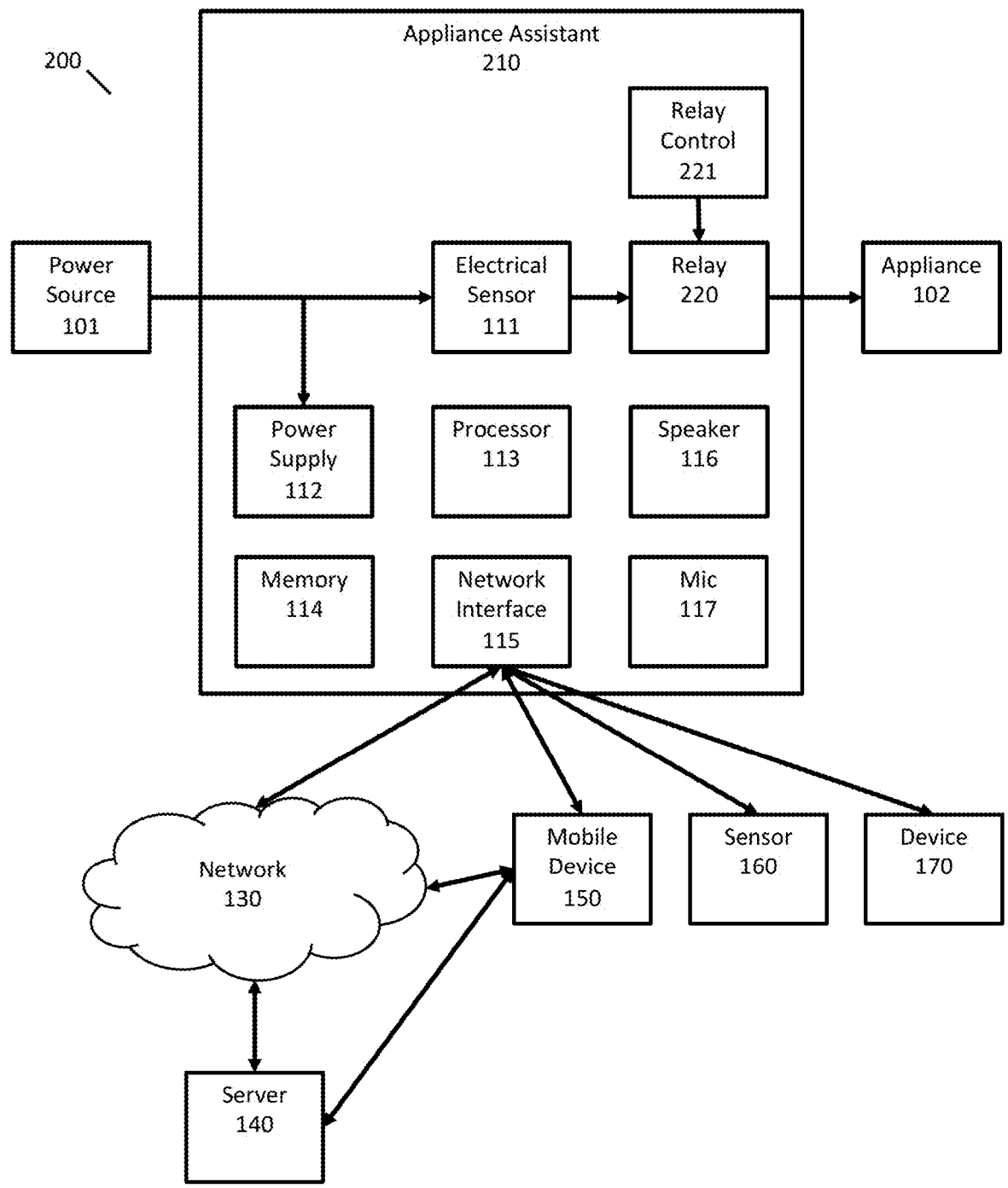
FIG. 2 is a is an example of a system for using an appliance assistant in conjunction with an appliance where the appliance assistant includes a relay.

FIG. 2 illustrates an exemplary system 200 for using an appliance assistant 210 in conjunction with an appliance 102 where appliance assistant 210 includes a relay. In FIG. 2, appliance assistant 210 is connected to power source 101 and appliance 102, as described above. Appliance assistant 210 may have any of the components and functionality of appliance assistant 110, and may have additional components and functionality. Appliance assistant 210 may also be implemented in a variety of formats as shown in FIGS. 1B, 1C, and 1D. In some implementations, appliance assistant 210 may be placed in a location such that it is not visible to people who use the appliance, may not have any human input components, may not have any human output components, and/or may have limited input and output components as described above.

Appliance assistant 210 may include a relay 220 on the electrical path between power source 101 and appliance 102. In the example, of FIG. 2, relay 220 is between electrical sensor 111 and appliance 102, but relay 220 may also be between electrical sensor 111 and power source 101. Relay 220 may be used to control whether electricity is transmitted to appliance 102. In some implementations, when relay 220 is open, appliance 102 does not receive any power at all (i.e., the appliance is disabled) and when relay 220 is closed, appliance 102 receives power as if it was connected directly to power source 120 (i.e., the appliance is enabled). In some implementations, relay 220 may control one hot wire of an appliance that has multiple hot wires (e.g., a 4 wire connection) and when relay 220 is open one hot wire will not receive power and another hot wire may receive power. In some implementations, relay 220 may control some or all hot wires or more than one relay 220 may control the hot wires of appliance 102. Relay 220 may be any type of relay, such as a latching relay or a solid state relay.

Appliance assistant 210 may include a relay control component 221 to change the state of relay 220. For example, relay control component 221 may receive a signal from processor 113 and then open or close relay 220 in response to the received signal. In some implementations, relay control component 221 is not needed and processor 113 may directly control relay 220.

Appliance assistant 210 may open or close relay 220 in any of the situations described above that caused appliance assistant 110 to send a notification (e.g., instead of or in addition to sending a notification). For example, in some of the situations described above, the appliance could be operating in a dangerous state (e.g., food cooking on a stove without anyone present), and opening relay 220 disables the appliance so that it is no longer consuming electricity and alleviates the dangerous situation.

For example, appliance assistant 210 may open relay 220 for any of the following events: appliance 102 has been on for longer than a specified period of time (e.g., setting a timer when appliance 102 is turned on and opening the relay at the expiration of the timer); appliance 102 is on and no authorized mobile devices are near appliance 102 (e.g., as determined using RSSI with a mobile device or using a motion sensor); appliance 102 is on and specific mobile devices are not near appliance 102 (e.g., adults); appliance 102 is on and a mobile device leaves the vicinity of appliance 102; the expiration of a timer after a mobile device leaves the vicinity of appliance 102 (e.g., setting a timer when the mobile device leaves the vicinity and opening the relay upon the expiration of the timer); receiving a message or notification from sensor 160; the expiration of any timers described herein, or receiving a message or notification from device 170. Appliance assistant 210 may close relay 220 for example, when the relay was previously opened and a mobile device (or authorized mobile device or specific mobile device) enters the vicinity of appliance 102.

In some implementations, a user may control the state of relay 220 from mobile device 150, such as by using an application on mobile device 150. A user may have left home and realized that he left appliance 102 on (possibly after receiving a notification from appliance assistant 210). The user may select a control in the application to send a message to appliance assistant 210 (e.g., via server 140 and/or network 130) to cause appliance assistant 210 to open relay 220. Similarly, a user may desire to close relay 220 using mobile device 150, and the user select a control in the application to send a message to appliance assistant 201 to cause appliance assistant 210 to close relay 220.

In some implementations, relay 220 may be closed using other techniques. For example, appliance assistant 210 may have a physical button or other control to cause relay 220 to close.

In some implementations, appliance assistant 210 may include circuitry that causes relay 220 to close when power source 101 is turned off. For example, power source 101 may be turned off by opening a circuit breaker in an electrical panel. When power source 101 is turned on again, circuitry in appliance assistant 210 may detect that power source 101 has gone from an off state to an on state and cause relay 220 to be closed.

In some implementations, appliance assistant 210 may close relay 220 in response to receiving specific audio signals at microphone 117. Appliance assistant 210 may be configured to recognize particular types of audio signals to trigger closing relay 220. For example, the audio signal may include a person speaking a command ("close relay"), a pattern of tones, or an audio signal that can't be heard by humans (e.g., frequencies higher than what humans can hear but which may be captured by a microphone). In some implementations, appliance assistant 220 may cause mobile device 150 to play a sound by sending a message to mobile device 150, microphone 117 may capture the sound, and then processor 113 may recognize the sound and cause relay 220 to close. This process may ensure that a person is in the vicinity of appliance 102 when relay 220 is closed because the person's mobile device is in range of microphone 117.

Appliance assistant 210 may also be used with appliances that are powered by means other than electricity (or in addition to electricity), such as appliances powered by fuel (e.g., natural gas or propane). For example, relay 220 may be replaced with a valve that may turn on or off the flow of fuel (e.g., a solenoid valve). The techniques described above for electrical appliances may also be applied to appliances powered by other means using techniques known to one of skill in the art.

In some implementations, an appliance assistant may have features as described in the following clauses, combinations of any two or more of them, or in combination with other clauses presented herein.

1. An appliance assistant connected to a power source and an appliance, the appliance assistant comprising:
   an electrical sensor, wherein the electrical sensor measures electricity provided to the appliance;
   a relay, wherein the relay is on an electrical path between the power source and the appliance;
   a network interface, wherein the network interface is configured to receive wireless signals from mobile devices in the vicinity of the appliance;
   a processor configured to:
      determine an operating state of the appliance,
      obtain identifiers from mobile devices in the vicinity of the appliance by processing wireless signals received at the network interface,
      set a timer based on the obtained identifiers or the absence of obtained identifiers,
      open the relay in response to the expiration of the timer;
   wherein the appliance assistant does not include human input devices.

2. The appliance assistant of clause 1, wherein the processor is configured to:
   in response to the expiration of the timer, (i) play a sound from a speaker of the appliance assistant or (ii) send a notification to a user device.

3. The appliance assistant of clause 1, wherein the processor is configured to:
   start a second timer in response to determining an operating state of the appliance; and
   open the relay in response to the expiration of the second timer.
4. The appliance assistant of clause 1, wherein the appliance assistant comprises circuitry configured to close the relay in response to the appliance assistant being disconnected from a power source and then reconnected to the power source.
5. The appliance assistant of clause 4, wherein the appliance assistant is disconnected from a power source and then reconnected to the power source by a person opening and closing a circuit breaker.
6. The appliance assistant of clause 1, wherein the appliance assistant is integrated into the appliance.
7. A system comprising the appliance assistant of any of clauses 1-6, an appliance, and a user device.
8. A method implemented by an appliance assistant, wherein the appliance assistant does not include human input devices, the method comprising:
   determining an operating state of the appliance;
   obtaining identifiers from mobile devices in the vicinity of the appliance by processing wireless signals received at the network interface;
   setting a timer based on the obtained identifiers or the absence of obtained identifiers; and
   open the relay in response to the expiration of the timer.
9. The method of clause 8, comprising the appliance assistant of any of clauses 1-6.
10. An appliance assistant connected to a fuel source and an appliance, the appliance assistant comprising:
   a fuel sensor, wherein the fuel sensor measures a flow of fuel provided to the appliance;
   a valve, wherein the valve is on a path of fuel between the fuel source and the appliance;
   a network interface, wherein the network interface is configured to receive wireless signals from mobile devices in the vicinity of the appliance;
   a processor configured to:
      determine an operating state of the appliance,
      obtain identifiers from mobile devices in the vicinity of the appliance by processing wireless signals received at the network interface,
      set a timer based on the obtained identifiers or the absence of obtained identifiers,
      close the valve in response to the expiration of the timer;
   wherein the appliance assistant does not include human input devices.

Appliance Assistant with Command Module and Switch Module

Figure 3A:
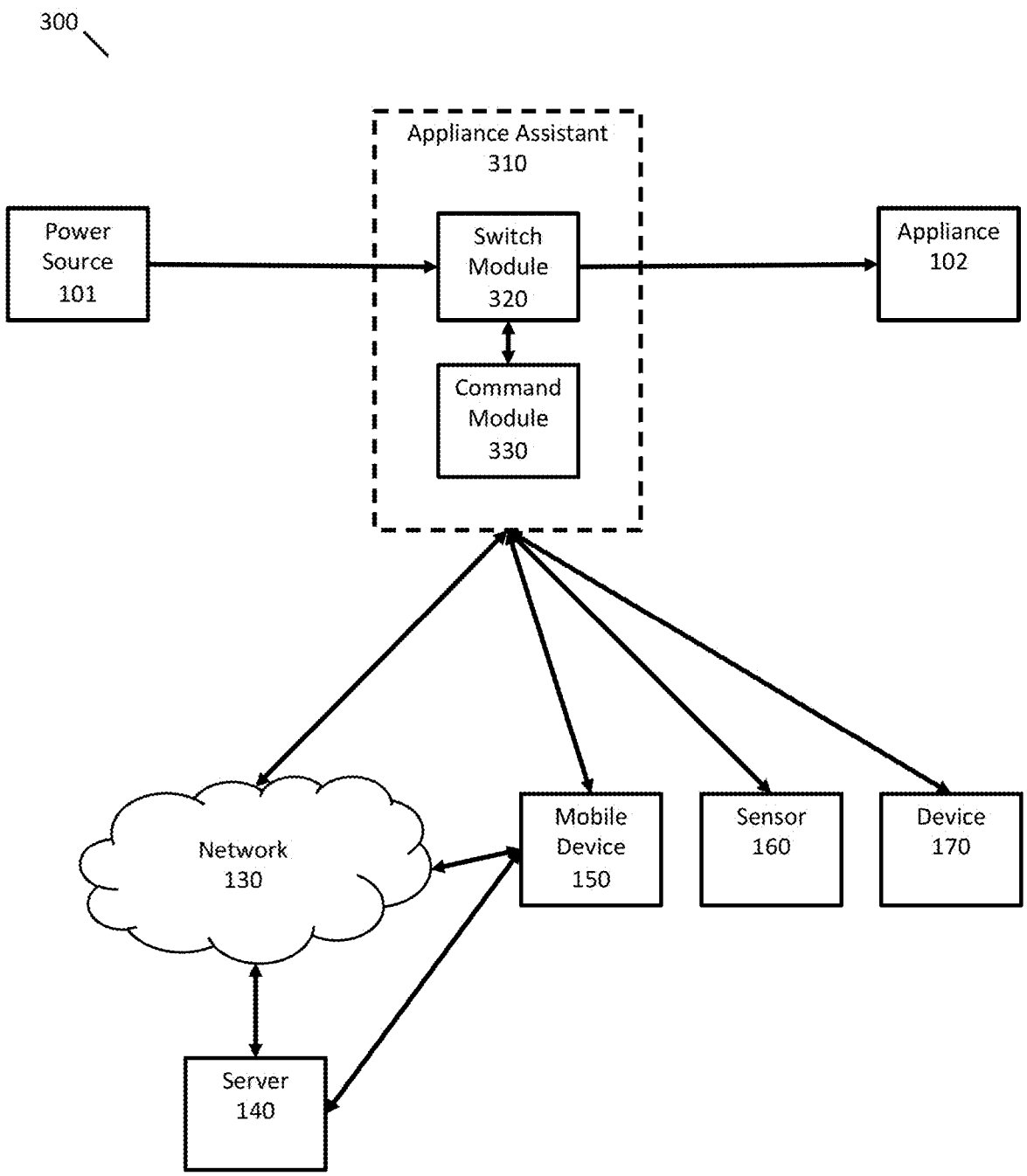
FIGS. 3A and 3B are examples of a system for using an appliance assistant in conjunction with an appliance where the appliance assistant has two modules.

FIG. 3A illustrates an exemplary system 300 for using an appliance assistant 310 in conjunction with an appliance 102, where components of appliance assistant 310 are split between a switch module 320 and command module 330 (or between more than two modules). In FIG. 3A, appliance assistant 310 is connected to power source 101 and appliance 102, as described above. Appliance assistant 310 may have any of the components and functionality of appliance assistant 110 or appliance assistant 210, and may have additional components and functionality.

Figure 3B:
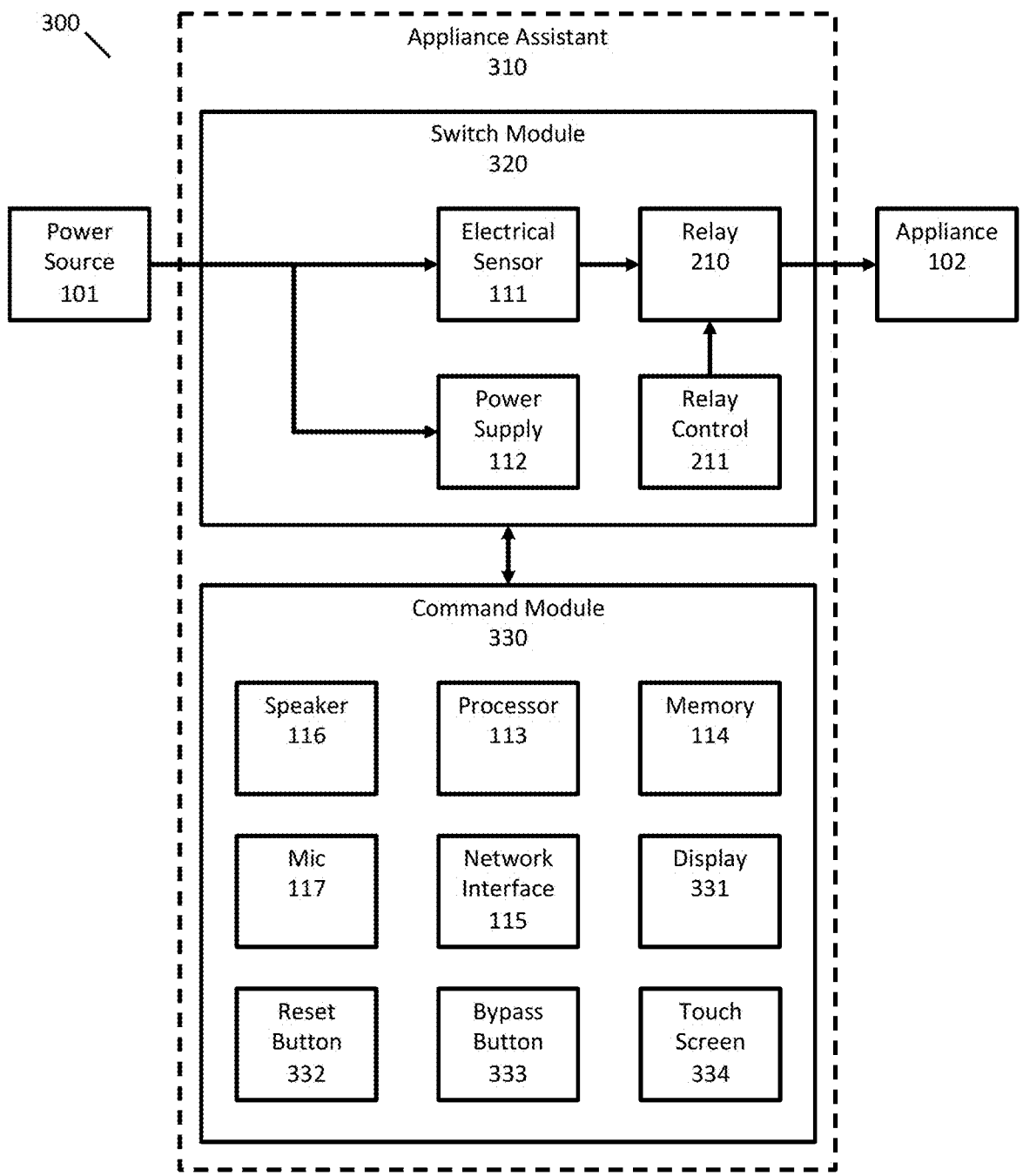

FIG. 3B illustrates an exemplary division of components between switch module 320 and command module 330, but any other functional divisions of components are possible. In the example of FIG. 3B, switch module 320 is connected to power source 101 and appliance 102, and electricity from power source 101 may travel through switch module 320 before reaching appliance 102. The exemplary switch module 320 may include any of electrical sensor 111, power supply 112, relay 210, and relay control 211, as described above. The exemplary command module 330 may include processor 113, memory 114, network interface 115, speaker 116, and microphone 117, as described above.

Appliance assistant 310 may include any input and output components, such as displays, keyboards, and touch screens. For example, exemplary command module 330 includes display 331, reset button 332, bypass button 333, and touch screen 334.

Figure 3C:
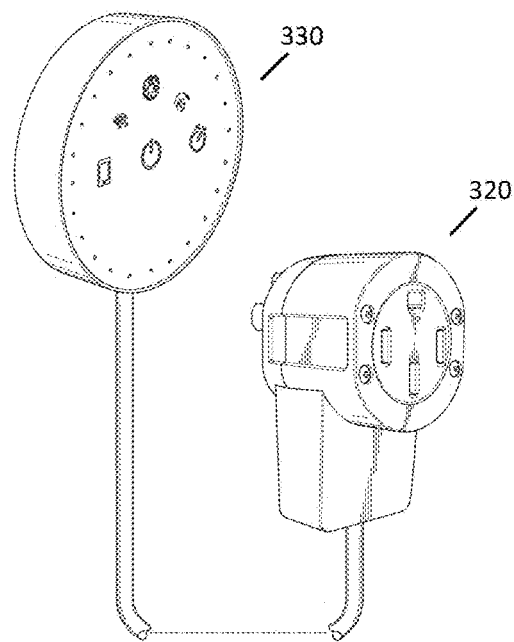
FIGS. 3C, 3D, and 3E are example implementations of an appliance assistant with two modules.
Figure 3D:
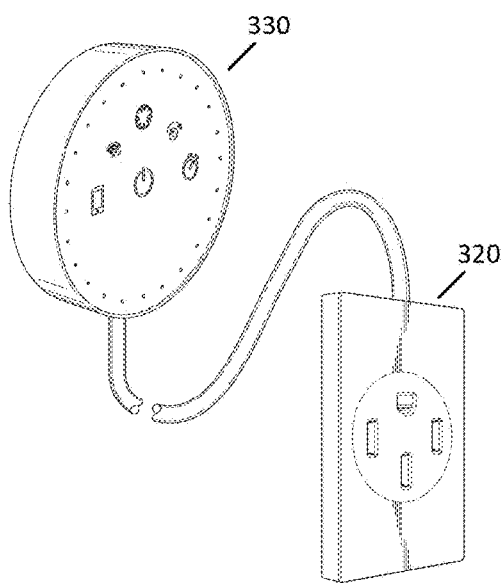
Figure 3E:
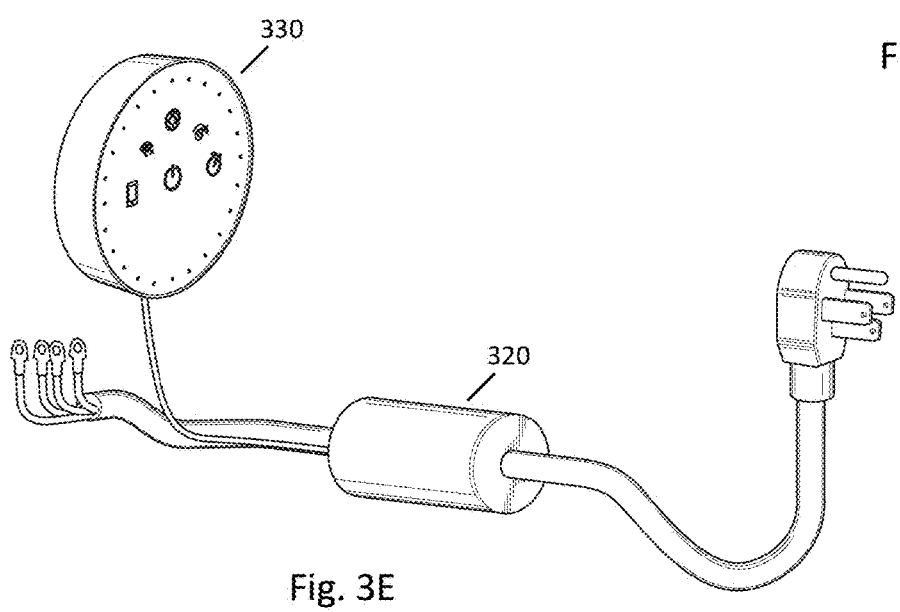

Appliance assistant 310 may be implemented in a variety of formats as shown in FIGS. 3C, 3D, and 3E. In FIG. 3C, switch module 320 takes the form of a plug (similar to plug 180) and command module 330 is connected to switch module 320 via a wire. In FIG. 3D, switch module 320 takes the form of an electrical outlet (similar to outlet 185) and command module 330 is connected to switch module 320 via a wire. In FIG. 3E, switch module 320 takes the form of a power cord (similar to power cord 190) and command module 330 is connected to switch module 320 via a wire. Switch module 320 and command module 330 may take any suitable form and may be connected wirelessly instead of via a wire.

In some implementations, switch module 320 may be placed in a location such that it is not visible to people who use appliance 102, may not have any human input components, may not have any human output components, and/or may have limited input and output components as described above. Command module 330 may be placed in an easily accessible location, such as on a counter or mounted on a wall.

Switch module 320 may be connected to command module 330 via one or more wires or cords. The wires may be separate or bundled together in a single cable jacket. For example, the wires may include a power source wire to provide power to command module 330 via switch module 330, a sensor wire to provide a measurement of current flow (or some other electrical property) to command module 350, and one or more wires to allow command module 330 to read or change the state of relay 220 in switch module 320.

In some implementations, bypass button 333 may effectively disable switch module 320 so that appliance assistant 310 is not able to disconnect appliance 102 from power source 101 and appliance 102 operates as if appliance assistant 310 was not present. For example, as described above, appliance assistant may open relay 210 when a mobile device leaves the vicinity of appliance 102. When the bypass button is pressed, appliance 102 may remain operational even if a mobile device leaves the vicinity of appliance 102. In some implementations, when the bypass button is pressed, switch module 320 may not be able to open relay 210, but other functionality may still be operable, such as sending notifications as described herein.

In some implementations, reset button 332 may close relay 211 so that appliance 102 may be used. For example, relay 210 may be opened if a mobile device leaves the vicinity of appliance 102. By pressing reset button 232, a person can re-enable the appliance (e.g., by closing relay 210).

Command module 330 may include buttons or other inputs that that provide other functionality. The other functionality may be provided by the manufacturer or the buttons may be programmed by a user to implement desired functionality. In some implementations, buttons may be programmed using techniques similar to technology provided by IFTTT (if this then that). For example, buttons may be programmed to take certain actions based on inputs from other sources (e.g., email or information available on the Internet) or the states of other devices (e.g., other devices in the house) and then use that information to determine an action to be performed. Examples of other functionality for buttons includes the following: (i) bypassing some but not all functionality of appliance assistant 310 (e.g., only halting functionality that causes the appliance to be turned off when appliance 102 is on for longer than a period of time or only halting functionality that causes the appliance to be turned off when a user is not present) to give a user greater flexibility in using the appliance, (ii) a button may inform family members, other people living in the house, or devices on a local network that dinner is ready, (iii) a button may be used as a remote control for turning on music, automatically ordering a pizza, turning lights off or on, unlocking or starting your car, calling a cab, calling your spouse, opening your garage door, ordering items from an online store (such as laundry detergent, diapers, sugar or dog food), or (iv) a button may be integrated with third-party services (such as Twitter, Facebook, Pinterest, Foursquare and others) to automatically post messages on social media, such as messages notifying your friends that you are cooking.

Command module 330 may present (e.g., via a display or LEDs) the state of switch module 320 and information about events that may have caused the current state of the switch module 320. For example, command module 330 may indicate that the appliance is enabled for use or may indicate that the appliance has been disabled and the reason for it being disabled (e.g., on too long or disabled by remote user).

Appliance assistant 310 may perform any of the actions described above for appliance assistant 210 or appliance assistant 110.

In some implementations, command module 330 may be connected to switch module 320 wirelessly and command module 330 may have its own power source. Each of command module 330 and switch module 320 may include a network interface, a processor, and any other components to facilitate wireless communication between them. In some implementations, command module 330 may not be a separate piece of hardware but may be software that runs on an existing device, such as a personal computer, smart phone, or other mobile device. For example, command module software may run as an application on a mobile device or it may be a web application that is accessed using a web browser on the existing device.

The above descriptions of command module 330 and switch module 320 are illustrative, and implementations are not limited to the above examples. Some components of command module 330 may be transferred to switch module 320 and vice versa. For example, in some implementations, switch module 320 may include one or more of a processor, storage, and network interfaces, and command module may only include components relating to input and output, such as buttons, LEDs, microphones, infrared sensors, motion sensors, temperature sensors, and a display.

Appliance assistant 310 may also be used with appliances that powered by means other than electricity (or in addition to electricity), such as appliances powered by fuel (e.g., natural gas or propane). The techniques described above for electrical appliances may also be applied to appliances powered by other means using techniques known to one of skill in the art.

In some implementations, an appliance assistant may have features as described in the following clauses, combinations of any two or more of them, or in combination with other clauses presented herein.

1. An appliance assistant, comprising:
    a switch module, wherein the switch module comprises:
        a relay configured to control the flow of electricity between the appliance and a power source, and
        an electrical sensor, wherein the electrical sensor measures electricity provided to the appliance; and
    a command module, wherein the command module:
        comprises a display,
        at least one input control, and
        is connected to the switch module via a cord;
    wherein the switch module and the command module are jointly configured to:
        determine an operating state of the appliance using an electrical sensor,
        obtain identifiers from user devices in the vicinity of the appliance by processing wireless signals received at a network interface of the device,
        set a timer based on the obtained identifiers or the absence of obtained identifiers,
        open the relay in response to the expiration of the timer.

2. The appliance assistant of clause 1, wherein:
    the command module comprises a motion sensor; and
    the switch module and the command module are jointly configured to:
        determine that a person is not present using data from the motion sensor, and
        set the timer based on the determination that a person is not present.

3. The appliance assistant of clause 1, wherein the switch module is placed so that it is not visible to a user operating the appliance and wherein the command module is placed so that it is visible to a user operating the appliance.

4. The appliance assistant of clause 1, wherein the switch module comprises a power supply that converts AC power to DC power, the switch module provides the DC power to the command module, and the switch module provides an output of the electrical sensor to the command module.

5. The appliance assistant of clause 1, wherein the switch module and the command module are jointly configured to:
    receive an instruction from a user device to disconnect the appliance from a power source, and
    open the relay in response to receiving the instruction.

6. The appliance assistant of clause 3, wherein the switch module and the command module are jointly configured to:
    receive an input from a user at the control module; and
    open the relay in response to receiving the input.

7. An appliance assistant, comprising:
    a switch module, wherein the switch module comprises:
        a valve configured to control the flow of fuel between the appliance and a fuel source, and
        an fuel sensor, wherein the fuel sensor measures a flow of fuel provided to the appliance; and
    a command module, wherein the command module:
        comprises a display,
        at least one input control, and
        is connected to the switch module via a cord;
    wherein the switch module and the command module are jointly configured to:
        determine an operating state of the appliance using the fuel sensor,
        obtain identifiers from user devices in the vicinity of the appliance by processing wireless signals received at a network interface of the device,
        set a timer based on the obtained identifiers or the absence of obtained identifiers, close the valve in response to the expiration of the timer.

Integrated Appliance Assistant

In some implementations, an appliance assistant may be integrated into an appliance by a manufacturer of the powered device. An integrated appliance assistant may have any of the features and components of other appliance assistants described herein. Where the appliance assistant is integrated into an appliance, the appliance assistant may be able to have access to additional information about the operation of the appliance as compared to a non-integrated appliance assistant, such as described above. In the following, an electric range (e.g., an appliance with one or more of a stove and/or an oven) will be used as an example of an appliance, but the techniques described herein are not limited to a range and may be applied to other appliances.

A range may have a variety of sensors to obtain information about the operation of the range, including any of the sensors described above. For example, a range may have one or more of the following sensors: electrical sensors for power to each of the burners of the stove; electrical sensors for power to heating elements of an oven; electrical sensors for power to a fan in a convection oven; one or more temperature sensors for individual burners of the stove and the oven; sensors that determine a position of a control (e.g., knob) on the range, such as whether the control is in the off position or if in an on position, a temperature or heat level corresponding to the position of the control; sensors that determine the state of a digital control (or this may be obtained by querying a range control board as described in greater detail below); infrared (IR) or thermal imaging sensors that determine temperature proximate to a burner of the stove or the oven; flame sensors that indicate whether is a fire or if a gas burner is operating; sensors that detect smoke to warn users prior to the ignition of oil or other flammable material; sensors that determine whether the oven door is open or closed; motion sensors that determine if a person is near the range; proximity sensors that determine whether a pot or pan is on a burner of a stove or in the oven. For a gas range, sensors may also include a flow sensor or a pressure sensor of the flow of gas to individual burners of the stove or individual heating elements of the oven.

In some implementations, a range may be connected to external sensors using a wired or wireless network interface. For example, sensors may be built in to a pot or a pan (such as in the handle of a pan), or a sensor unit may be created that can be attached to a pot or a pan or attached to another location (e.g., on a cabinet or above the range). The external sensor may include any of the sensors described herein, such as a temperature sensor. The external sensor may communicate with the range using any suitable wired or wireless communication protocols, such as Bluetooth, Zigbee, NFC, or Wi-Fi.

In some implementations, a sensor may be built into the range and positioned above the stove to be able to obtain information regarding the operation of a stove of a range. For example, an IR or thermal sensor may be positioned above the stove. In some implementations, multiple sensors may be positioned above the stove and each sensor may be focused on a burner of the stove.

In some implementations, a sensor may be attached to the handle of a pot or a pan. For example, a handle attachment may be approximately the size of a handle of a pot or pan and have an opening that allows the handle attachment to be attached to the handle of a pot or pan. The handle attachment may have a second opening that allows a sensor to be inserted into the handle attachment. The sensor may be of any of the sensor types discussed above. Either the handle attachment or the sensor may have a network interface (e.g., Bluetooth, Zigbee, NFC, or Wi-Fi) that allows the range to receive data from sensor. When handle attachment is attached to the handle of a pot or pan, the sensor may be arranged to obtain an accurate reading from the pot or pan (e.g., be close to a cooking surface of the pot or pan).

An appliance assistant integrated into a powered device may have access to data from any of the above sensors. An appliance assistant may be integrated into a powered device in a variety of ways, such as the following examples.

A conventional range may have a control board to control the operation of a range. For example, a conventional control board may monitor the temperature of the oven and turn on or off a heating element to maintain a desired temperature. The control board may be implemented using any suitable technologies, such as a circuit board, a microcontroller, or a computer processor. In some implementations, a smart controller may be integrated into the control board of the range. The combined control board/smart controller may receive inputs from any of the sensors described above. The display of the smart controller may be combined with the display of the range control board so that all information is presented in a single display.

In some implementations, the appliance assistant may be separate from the range control board but receive information from the range control board. A range control board may provide an interface to allow the appliance assistant to obtain information from the control board and/or to send information or control signals to the control board. For example, the control board may have one or more input or output ports and receive and transmit information using any suitable communication protocol, such as UART, I2C, CAN bus, or SPI. The control board may implement a communications protocol where the appliance assistant can request information from the control board. For example, the appliance assistant may request the temperature of the oven or may request the status of all sensors in the range. The display of the appliance assistant may be combined with or separate from the display of the range control board.

In some implementations, a hardware standard may be established for integrating an appliance assistant in a range so that the appliance assistant may communicate with the control board of the range. For example, a range may be created with a plug using a standardized or proprietary format and the appliance assistant may be added to the range by inserting a connector into the plug. The plug may be inside the range or on an exterior surface that is accessible to a user. For example, the plug may be near the display of the range, so that an appliance assistant may be plugged in so that the display of the appliance assistant will be visible to users of the range.

In some implementations, the appliance assistant may be directly connected to sensors in the range. The appliance assistant may connect directly to existing sensors in the range (e.g., by splicing a connection), or sensors may be added to the range and connected to the appliance assistant.

An appliance assistant may be configured in any of the above ways and may obtain information from any of the sensors described above. The appliance assistant may use the information from the sensors to provide specific functionality.

In some implementations, the appliance assistant can detect dangerous situations, such as high temperatures or fires, and cause portions (e.g., a burner) or all of the range to be turned off. For example, using any of the sensors described above, a temperature may be measured proximate to a burner (e.g., a temperature sensor built into the range or a temperature sensor attached to a pot or pan). The data from the sensors may be processed with an algorithm (e.g., a rule based algorithm or a neural network) to determine when the current conditions are likely unsafe. For example, the temperature of a pan may be compared to a flash point of oil, and the burner may be turned off if the temperature gets close to or exceeds the flash point. In some implementations, a user may specify the type of oil currently being used or the type of oil commonly used so that the flash point may be determined.

In some implementations, cooking activity may be recorded to create a "recipe" for a meal that was cooked. This recipe may be reused in the future to make it easier to make the same meal again or shared with others to help them recreate the meal. For example, to cook a certain food, the oven may need to be preheated to a first temperature. After the food has been inserted into the oven, it may be cooked at the first temperature for a first amount of time. Afterwards, the oven may be decreased to a second temperature, and the food may be cooked at the second temperature for a second amount of time. Afterwards, cooking may be complete and the oven turned off. This sequence of actions may be recorded and stored as a recipe in the appliance assistant. The next time a user wishes to cook the same food, the stored recipe can be used to automatically control the oven temperature for the duration of cooking the food. The appliance assistant or an application on a user device (e.g., smart phone) may allow a user to record, reuse, or share with a friend who also has an appliance assistant on his or her range.

In some implementations, a recipe for cooking may be manually created. For example, a recipe may be obtained from another source (e.g., downloaded from a website) or created by a user, such as by creating a recipe on a website or in an application running on a user device. For example, a user may create a recipe with one or more of the following steps: (1) preheat the oven to 400 degrees; (2) when the oven reaches 400 degrees provide an alert (e.g., speech or sound from the smart controller or a user device; (3) after the food is put into the oven (e.g., as detected by sensors detecting the oven door opening and closing and/or proximity sensors inside the oven determining that food is in the oven) start a timer for 30 minutes; (4) after 30 minutes, reduce the temperature of the oven to 200 degrees and/or provide an alert; and (5) after detecting that the food has been removed from the oven (e.g., as detected by oven door and/or proximity sensors), turn the oven off.

In some implementations, appliance assistant can control the appliance based on information received from a user. For example, using an application (e.g., a smart phone application) a user can indicate the food that he is cooking, such as cooking a whole chicken that weighs 10 pounds. Information about how to cook the indicated food can be retrieved from a database, and the appliance can be configured to cook the food according to the recipe. For example, a temperature and time may be set for the oven to cook the chicken so that it is not over or under cooked.

In some implementations, an appliance assistant may provide control of a range that is not available with conventional ranges. For example, it may be desired to increase the temperature of an oven from 200 degrees to 400 degrees over 30 minutes where the temperature increases linearly over the time period. A simple programming language or other interface may be provided to allow users to create a wide variety of temperature profiles or to create an arbitrary sequence of steps for controlling a range.

In some implementations, an appliance with an integrated appliance assistant may be connected to other sensors or devices in the house, such as described above.

In some implementations, an appliance with an appliance assistant may interact with a smoke detector, carbon monoxide detector, or other hazardous gas detector to provide for a better experience for a user. For example, the appliance assistant of a range may send a message to a smart smoke detector to inform the smoke detector of usage of the range. The smoke detector may then increase thresholds for generating an alarm so that safe cooking activity does not generate unwanted alarms. Either the appliance assistant or the smoke detector may determine a desired change to a threshold for causing the smoke alarm to sound. For example, the appliance assistant may request that the smoke alarm increase its threshold by a percentage or to a specified parts-per-million of a detected particle. The appliance assistant may determine the desired change in threshold based on the cooking activity of the user. For example, use of a burner at a low temperature or use of the oven may not change the threshold at all or change the threshold only slightly. Use of a burner at a high temperature may change the threshold by a larger amount. In some implementations, that change in threshold may be specified by a user.

In some implementations, an appliance with an appliance assistant may receive a message from the smoke detector when the smoke detector has detected smoke and generated an alarm. In response to receiving this message, the appliance assistant may cause the range to be turned off, sound an alarm, and/or provide a visual indication.

In some implementations, an appliance with an appliance assistant may receive a message from a thermostat indicating that the temperature in the house is higher than usual or that the temperature is unexpectedly high. A high temperature may indicate that there is a fire. The appliance assistant may automatically shut down the appliance in response to a high temperature exceeding a threshold or meeting a criterion. In some implementations, when the oven is being used for an extended period of time and/or at a high temperature, an appliance assistant may send a message to the thermostat to reduce the heat to prevent the house from getting too hot.

In some implementations, a display of an appliance with an appliance assistant can present information about other devices in the house. For example, a display of the appliance may indicate that a threshold for sounding an alarm by the smoke detector has increased or that the smoke detector is generating an alarm.

In some implementations, an appliance assistant of a range may serve as a hub of an Internet-of-things system, and may be connected to a wide variety of smart devices, such as light bulbs, smoke detectors, thermostats, door locks, and other sensors/devices throughout the home. Any of the functionality described above may also be implemented by the appliance communicating with an Internet-of-things device.

An integrated appliance assistant may also be used with appliances that powered by means other than electricity (or in addition to electricity), such as appliances powered by fuel (e.g., natural gas or propane). The techniques described above for electrical appliances may also be applied to appliances powered by other means using techniques known to one of skill in the art.

In some implementations, an appliance assistant may have features as described in the following clauses, combinations of any two or more of them, or in combination with other clauses presented herein.

1. An electric range comprising:
   a first burner;
   a second burner;
   an oven;
   a first sensor that indicates electrical usage by a first burner;
   a second sensor that indicates electrical usage by a second burner;
   a third sensor that indicates electrical usage by a heating element of an oven;
   a fourth sensor that indicates temperature proximate to the first burner of the stove;
   a fifth sensor that indicates temperature proximate to the second burner of the stove;
   a sixth sensor that indicates temperature proximate to the oven; and
   a control board configured to:
      receive measurements from each of the first sensor, second sensor, third sensor, fourth sensor, fifth sensor, and sixth sensor,
      turn off at least one of the first burner, the second burner, or the oven based at least in part on processing the received measurements.
2. The electric range of clause 1, further comprising:
   a seventh sensor that detects a position of a door to the oven; and
   wherein the control board is further configured, based at least in part on a measurement from the seventh sensor, to (i) modify a temperature setting of the oven or (ii) turn off the oven.
3. The electric range of clause 1, further comprising:
   a wireless network interface to communicate with an external sensor; and
   wherein the control board is further configured to:
      receive a measurement from the external sensor via the wireless network interface, and
      turn off at least one of the first burner, the second burner, or the oven based at least in part on the measurement from the external sensor.
4. The electric range of clause 1, wherein the control board is further configured to:
   obtain instructions regarding a sequence of operations for controlling at least one of the first burner, the second burner, or the oven; and
   implement the instructions.
5. The electric range of clause 1, wherein the control board is further configured to send a message to a second device with information about the state of the range or instructions to modify a setting of the second device.
6. An gas range comprising:
   a first burner;
   a second burner;
   an oven;
   a first sensor that indicates gas usage by a first burner;
   a second sensor that indicates gas usage by a second burner;
   a third sensor that indicates gas usage by a heating element of an oven;
   a fourth sensor that indicates temperature proximate to the first burner of the stove;
   a fifth sensor that indicates temperature proximate to the second burner of the stove;
   a sixth sensor that indicates temperature proximate to the oven; and
   a control board configured to:
      receive measurements from each of the first sensor, second sensor, third sensor, fourth sensor, fifth sensor, and sixth sensor,
      turn off at least one of the first burner, the second burner, or the oven based at least in part on processing the received measurements.

Electrical Panel Appliance Assistant

Figure 4B:
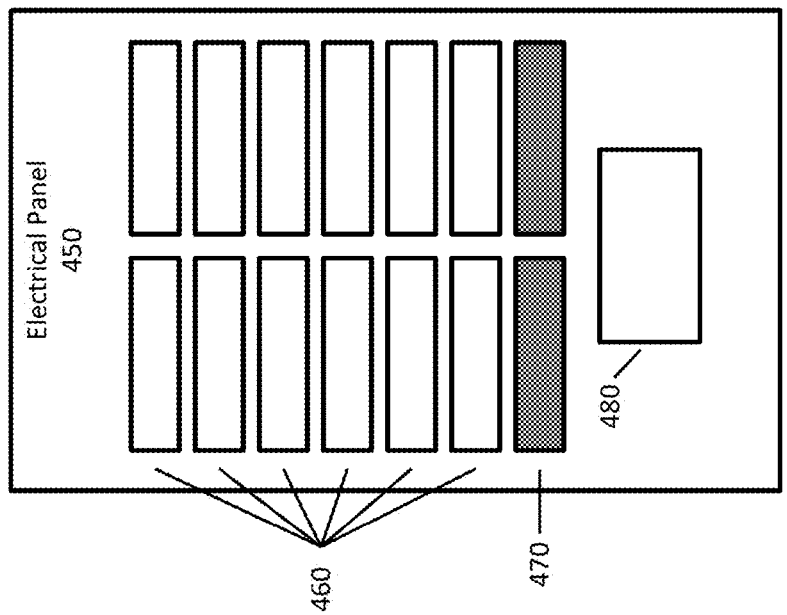
FIGS. 4A and 4B are examples of electrical panels with retrofit circuit breakers.
Figure 4A:
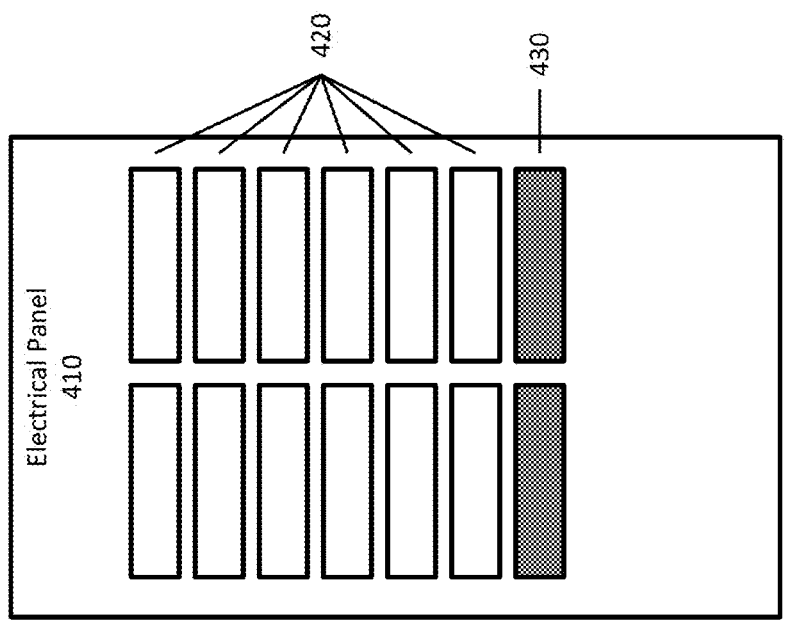

An appliance assistant may also operate in conjunction with an electrical panel, for example by retrofitting part of an electrical panel, such as a circuit breaker. FIGS. 4A and 4B illustrate two examples of adding an appliance assistant to an electrical panel.

In FIG. 4A, electrical panel 410 has conventional circuit breakers 420. In addition, two retrofit circuit breakers 430 have been added to electrical panel 410. Retrofit circuit breakers may have been added to empty slots in electrical panel 410 or conventional circuit breakers may have been removed and replaced with retrofit circuit breakers. Any number of conventional circuit breakers may be replaced with retrofit circuit breakers. Each of the retrofit circuit breakers may apply to a different circuit in the building. For example, one retrofit circuit breaker may be for a circuit for a stove and another retrofit circuit breaker may be for a circuit for a dryer. Each of the retrofit circuit breakers may include any of the components of appliance assistant described above and provide all of the corresponding functionality.

In FIG. 4B, electrical panel 450 has conventional circuit breakers 460. As above, two retrofit circuit breakers 470 have been added to electrical panel 450. Each of the retrofit circuit breakers 470 may include any of the components of switch module 320 and provide all of the corresponding functionality. In addition, electrical panel 450 may include a common command module 480 for controlling multiple retrofit circuit breakers 470. Although common command module 480 is presented inside of electrical panel 450, it need not be within electrical control panel 450 and may instead be adjacent to electrical control panel 450 or in a different location and connected via a wired or wireless network.

Figure 5A:
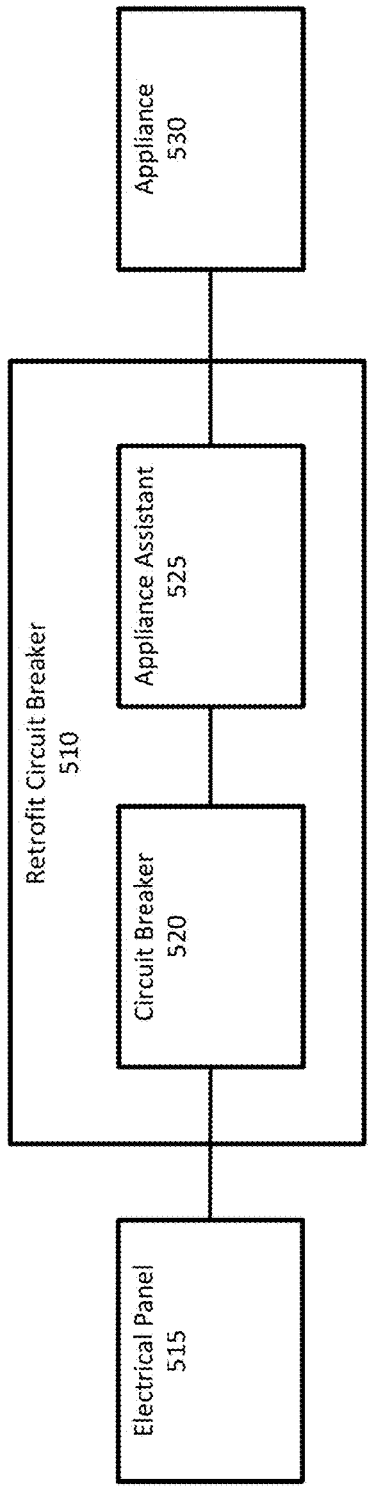
FIGS. 5A and 5B are examples of retrofit circuit breakers.
Figure 5B:
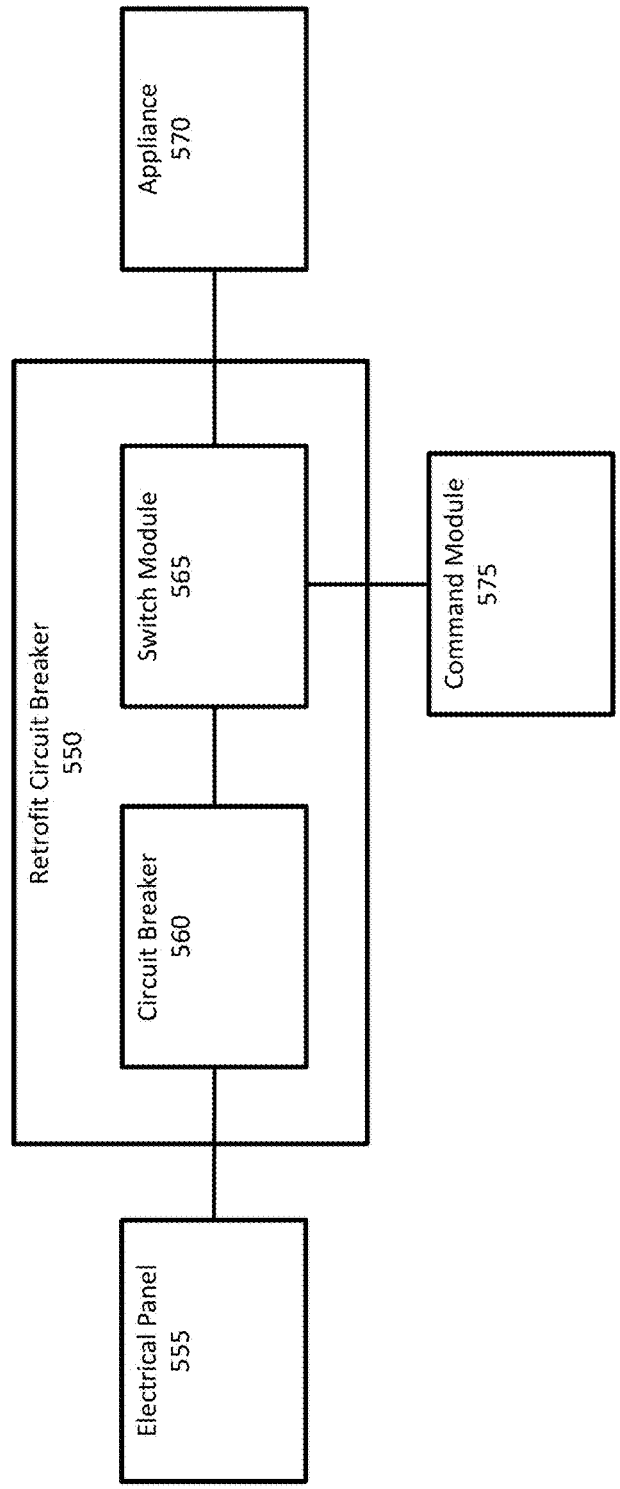

FIGS. 5A and 5B illustrate additional details of possible implementations of retrofit circuit breakers. FIG. 5A illustrates additional details of an example retrofit circuit breaker that may be used with electrical panel 410 of FIG. 4A. In FIG. 5A, retrofit circuit breaker 510 includes a conventional circuit breaker 520 and appliance assistant 525 that includes some or all of the components of the appliance assistants described herein. Circuit breaker 520 is connected to electrical panel 515 in a manner similar to a conventional electrical panel and circuit breaker. The output of circuit breaker 520 is input to appliance assistant 525 and the output of appliance assistant 525 is connected to appliance 530 via conventional electrical wiring.

FIG. 5B illustrates additional details of an example retrofit circuit breaker that may be used with electrical panel 450 of FIG. 4B. In FIG. 5B, retrofit circuit breaker 550 includes a conventional circuit breaker 560 and switch module 565 that includes some or all of the components of switch module 320 described above. Circuit breaker 560 is connected to electrical panel 555 in a manner similar to a conventional electrical panel and circuit breaker. The output of circuit breaker 560 is input to switch module 565 and the output of switch module 565 is connected to appliance 570 via conventional electrical wiring. Switch module 565 is also connected to command module 575. Command module 575 may also be connected to other switch modules in other retrofit circuit breakers.

In some implementations, the ordering of components may be different. For example, the ordering of circuit breaker 520 and appliance assistant 525 may be reversed or the ordering of circuit breaker 560 and switch module 565 may be reversed. In some implementations circuit breaker 520 may be within appliance assistant 525 or circuit breaker 560 may be within switch module 565. For example, the ordering of components in FIG. 5A may be electrical panel 515, electrical sensor, circuit breaker 520, and then a relay. Any functional ordering of components may be used.

Switch/command module 525 or the combination of switch module 565 and command module 575 may provide any of the functionality described above. For example, when an appliance has been on for longer than a specified time, these modules may open a relay to disable the appliance. Similarly, these modules may detect that a mobile device is not present and open a relay to disable an appliance. Also, these modules may receive a command from a remote user via a network interface to disable an appliance, and may then open a relay to disable the appliance.

In some implementations, an appliance assistant may have features as described in the following clauses, combinations of any two or more of them, or in combination with other clauses presented herein.

1. A retrofit circuit breaker for an electrical panel comprising:
   a first connection to a power source;
   a second connection to an electrical circuit;
   a circuit breaker;
   an electrical sensor;
   a relay;
   a network interface; and
   a processor, wherein the processor is configured to change the state of the relay in response to an input, wherein the input comprises at least one of a reading from the electrical sensor or data received via the network interface.

2. The retrofit circuit breaker of clause 1, wherein the electrical sensor is a current sensor or a voltage sensor.

3. A system comprising:
   a first retrofit circuit breaker comprising a first circuit breaker, a first electrical sensor, and a first relay, wherein the first retrofit circuit breaker is configured to:
      transmit a first sensor reading from the first electrical sensor to a command module, and
      receive a first signal from the command module to change a state of the first relay, and
      change the state of the first relay;
   a second retrofit circuit breaker comprising a second circuit breaker, a second electrical sensor, and a second relay, wherein the second retrofit circuit breaker is configured to:
      transmit a second sensor reading from the second electrical sensor to the command module,
      receive a second signal from the command module to change a state of the second relay, and
      change the state of the second relay;
   the command module comprising a network interface and a processor, wherein:
      the command module is configured to receive the first sensor reading from the first retrofit circuit breaker and receive the second sensor reading from the second retrofit circuit breaker,
      the processor is configured to process at least one of the first sensor reading, the second sensor reading, or data received via the network interface,
      the command module is configured to send the first signal to the first retrofit circuit breaker, and
      the command module is configured to send the second signal to the second retrofit circuit breaker.

4. The system of clause 3, wherein the first retrofit circuit breaker transmits the first sensor reading to the command module using a wireless network.

Remote Enablement

As described above, an appliance assistant may open a relay to disable an appliance by preventing the appliance from having a source of electricity. A user may later desire to enable the appliance by causing the appliance assistant to close the relay. In some implementations, a remote user may be able to enable or disable the appliance using a mobile device, such as a smartphone. When a remote user changes the state of the appliance from disabled to enabled, it may create a dangerous situation. For example, suppose the appliance is a stove. If the control of a burner of a stove is in the on position but the appliance assistant has disabled the stove, then the burner will not emit any heat. If a remote user then causes the appliance assistant to enable the stove, then the burner will start emitting heat. Since the user is remote, he is not home to monitor the burner and the burner could start a fire.

Figure 6:
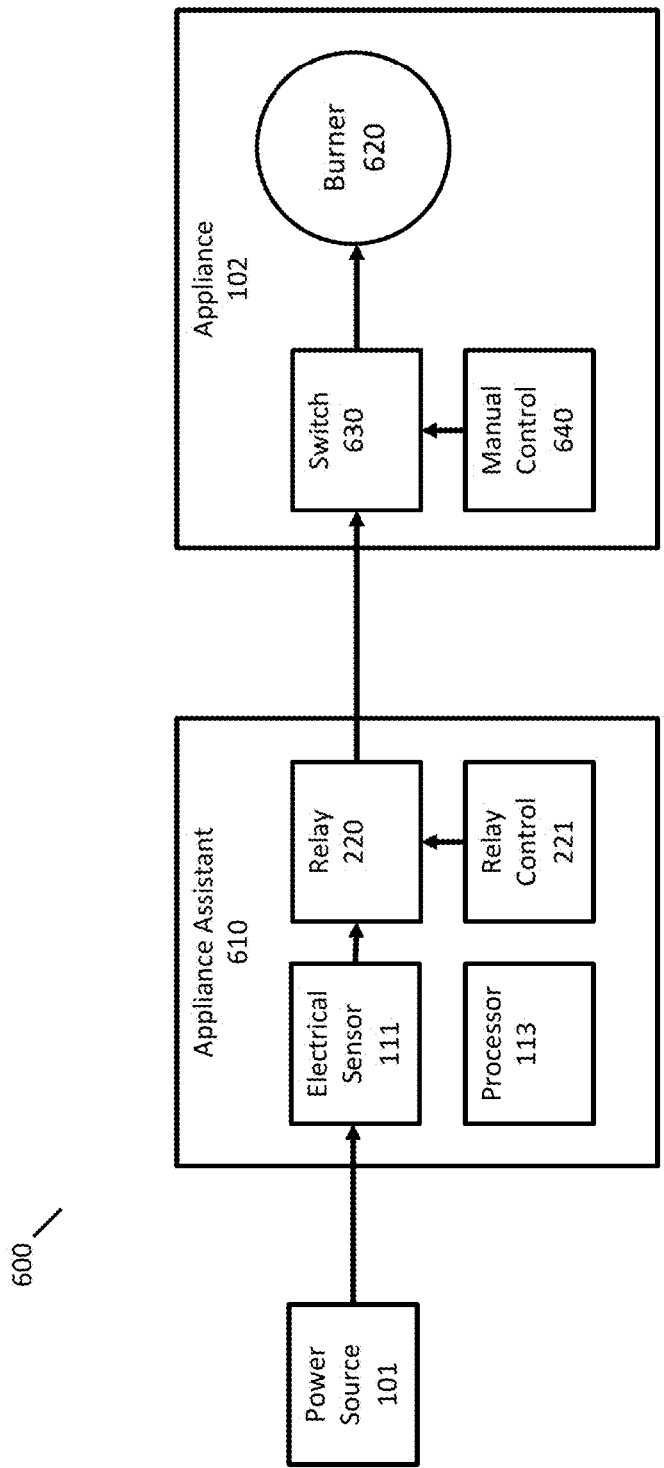
FIG. 6 is an example of a system for using an appliance assistant to allow remote enablement of an appliance.

FIG. 6 illustrates an exemplary system 600 for control of an appliance 102 that prevents remote enabling of an appliance that would cause a dangerous situation. For clarity of presentation, the example of FIG. 6 illustrates an electric stove, but any other appliance or powered device may be used in its place as described in greater detail below.

FIG. 6 includes appliance 102, which may be a conventional stove. Appliance 102 may include one or more burners, such as burner 620. Appliance 102 may also include one more controls, such as manual control 640, for controlling burner 620. Manual control 640 may include any type of control for controlling a burner, such as a button or a knob. Manual control 640 may control the operation of burner 620 via switch 630. Manual control 640 and switch 630 may be part of a single unit or may be separate units that work in conjunction with each other. For example, manual control 640 may be a mechanical control that causes switch 630 to close and thus supply electricity to burner 620. Switch 630 may have two states (on and off), may have multiple states, or may have a continuous range of states (such as for the temperature of a burner or a dimmer switch).

FIG. 6 includes power source 101, which may be any type of power source, as described herein. Appliance assistant 610 may be connected to appliance 102 using any of the techniques described herein. For example, appliance assistant may be in the form of a plug, electrical outlet, or power cord, may be integrated with appliance 102, and may or may not have a command module.

Appliance assistant may include relay 220. Relay 220 may be used to control whether power is transmitted to appliance 102. In some implementations, when relay 220 is open, appliance does not receive any power at all and when relay 220 is closed, appliance 102 receives power as if it was connected directly to power source 101. In some implementations, relay 220 may control one hot wire of a stove that has multiple hot wires (e.g., a 4 wire connection) and when relay 220 is open one hot wire will not receive power and another hot wire may receive power. In some implementations, relay 220 may control some or all hot wires or more than one relay 220 may control the hot wires of appliance 102. Accordingly, relay 220 may enable or disable operation of the stove.

Relay 220 may be controlled by a variety of mechanisms, such as any of the mechanisms described above. For example, appliance assistant 610 may (i) have a physical control for controlling relay 220, (ii) may be connected via a network to a computing device (e.g., connected to a smart phone via Wi-Fi or Bluetooth) and relay 220 may be controlled by software running on the computing device, or (iii) may have other logic for deciding when to open and close relay 220 using other available information as described in greater detail below.

In some implementations, appliance assistant 610 may have an electrical sensor 111 for determining electrical usage of appliance 102. Electrical sensor 111 may include any sensor for determining a voltage, current, power, or any other electrical property. Appliance assistant 610 may include any of the components and/or features of any of the appliance assistants described herein.

In the system of FIG. 6, the combinations of relay 220 and switch 630 have four possible states: both open, both closed, relay 220 open and switch 630 closed, and relay 220 open and switch 630 closed. Only when both are closed is appliance 102 operational.

As described above, switch 630 corresponds to manual control 640 on appliance 102, and relay 220 may be controlled remotely by a mobile device, such as a smartphone. If switch 630 is closed, and a remote user uses his mobile device to close relay 220, then burner 620 will be operational. Because the user is remote from appliance 102, it may create a dangerous situation. In some implementations, the remote user may not know the status of switch 630 and may inadvertently create a dangerous situation.

To prevent a dangerous situation, appliance assistant 610 may determine the status of switch 630 using electrical sensor 111. If relay 220 is closed and electrical sensor 111 detects a flow of electricity, then switch 630 is also closed. If relay 220 is closed and electrical sensor 111 does not detect a flow of electricity, then switch 630 is open.

When a remote user operates a mobile device to enable appliance 102, a signal will be sent to appliance assistant 610, for example, using any of the techniques described herein. Appliance assistant 610 receives the signal (which may correspond to a request to enable appliance 102), and may then perform a sequence of operations. In some implementations, appliance assistant may determine whether the remote user is authorized to enable the appliance, and if the remote user is not authorized, then the state of the appliance may not be changed. If the remote user is authorized, then appliance assistant 610 may proceed to close relay 220. After closing relay 220, processing appliance assistant may monitor the flow of electricity using electrical sensor 111. The flow of electricity may be monitored for a minimum or predetermined time period to account for time delays in the flow of electricity. If no electricity flow is detected by electrical sensor 111, then it may be determined that burner 620 is not active and relay 220 may remain closed. If electricity flow is detected by electrical sensor 111, then it may be determined that burner 620 is active, and relay 220 may subsequently be opened to prevent a dangerous situation.

Any appropriate techniques may be used to determine whether sufficient electricity flow is detected by electrical sensor 111 to warrant opening relay 220. In some implementations, a total amount of energy passing electrical sensor 111 over a period of time may be measured, and this amount of energy may be compared to a threshold. If the amount of energy is greater than the threshold, then relay 220 is opened.

Figure 7C:
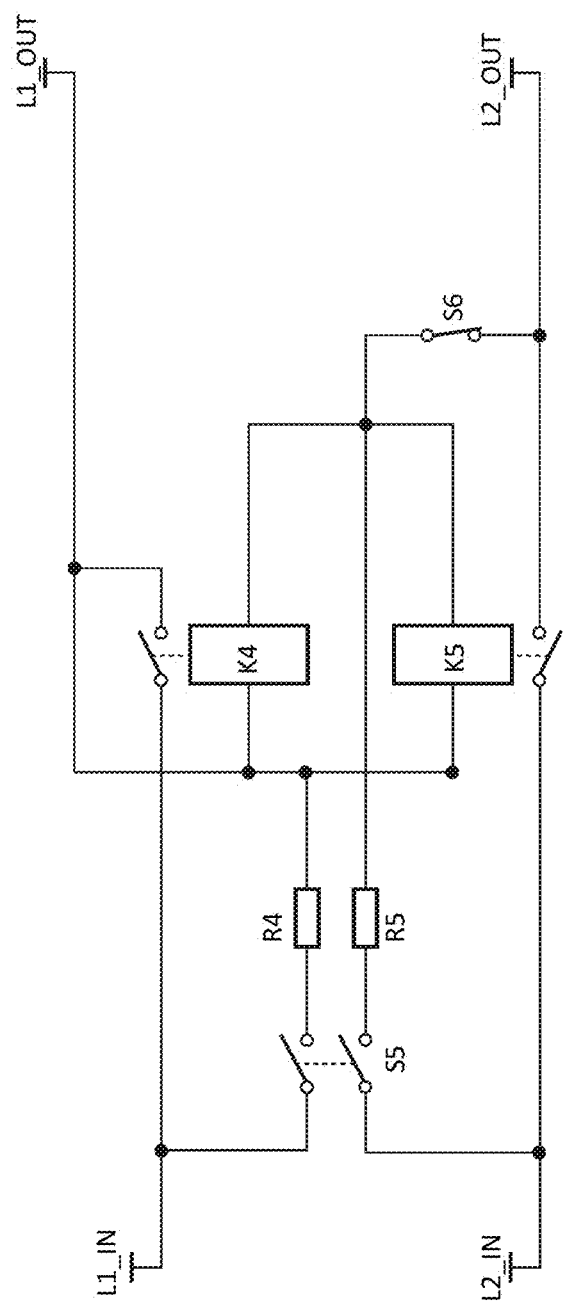

In some implementations, appliance assistant 610 may use other circuitry, such as the circuitry of FIGS. 7A-C, to control closing of the relay. This circuitry may determine when closing a relay in appliance assistant would cause a burner to be active and then reopen the relay, or may prevent closing of the relay.

FIG. 7A illustrates an example of a circuit that may be used with an appliance that has a two or three-wire power cord (e.g., a hot wire and ground and/or neutral wires). In FIG. 7A, L_IN and N_IN represent hot and neutral wires from a power source (e.g., electrical outlet) and going into appliance assistant 610. L_OUT and N_OUT represent hot and neutral wires going from appliance assistant 610 to appliance 102. S1 and S2 are switches that may be controlled by appliance assistant 610, such as physical or computer-controlled switches (e.g., an opto-coupler). K1 is a relay that may be controlled by current flow in the circuit of FIG. 7A, such as an electromechanical relay, solid-state relay, or a TRIAC. R1 is a resistor that may be used to control the state of relay K1. In some implementations, the resistance of R1 may be small relative to the coil resistance of relay K1 but large relative to the element of appliance 102 having the largest resistance.

In regular operation of the circuit of FIG. 7A, switch S1 may be open and switch S2 may be closed. In this state, the contacts of relay K1 may be open or closed. When the contacts of relay K1 are open, no current is being transmitted to appliance 102 and when the contacts of relay K1 are closed, current is being transmitted to appliance 102. When the contacts of relay K1 are open, the coil of relay K1 is not connected to the hot (L_IN) wire, current does not pass through the coil of relay K1, and the contacts of relay K1 stay in the open state. When the contacts of relay K1 are closed, the coil of relay K1 is connected to both the hot (L_IN) and neutral (N_IN) wires, current passes through the coil of relay K1, and the contacts of relay K1 stay in the closed state.

The state of relay K1 may be modified by temporarily changing the state of switch S1 or switch S2. If the contacts of relay K1 are closed (so appliance 102 is receiving power), then the contacts of relay K1 may be opened by temporarily opening switch S2. Opening switch S2 breaks the current flow through the coil of relay K1 and causes the contacts of relay K1 to open, and after closing switch S2, the contacts of relay K1 will remain closed because the coil of relay K1 is no longer connected to hot wire L_IN.

If the contacts of relay K1 are open (so appliance 102 is not receiving power), then temporarily closing switch S1 may be used to attempt to close the contacts of relay K1, but the contacts of relay K1 will only close where appliance 102 is otherwise turned off (e.g., all the controls of appliance 102 are in an off position). The effect of temporarily closing switch S1 is different when all the controls of appliance 102 are in an off position and when at least one control of appliance 102 is in an on position.

When all the controls of appliance 102 are in an off position, current (or at least a significant level of current) will not flow through appliance 102. Accordingly, when switch S1 is closed, all (or nearly all) of the current will flow through the coil of relay K1. The resistance of the coil of relay K1 and other elements of the circuit (e.g., the resistance of resistor R1) may be configured so that the current flowing through the coil of relay K1 is large enough to cause the contacts of relay K1 to close. After opening switch S1, the coil of relay K1 is still receiving current through the contacts of relay K1 and thus the contacts of relay K1 remain closed.

When at least one control of appliance 102 is in an on position, current is able to flow through appliance 102. Accordingly, when switch S1 is closed, current will pass through resistor R1 and then be split between appliance 102 and the coil of relay K1. The amount of current passing through the coil of relay K1 depends on the relative resistance of the coil of relay K1 and the resistance of the operating element(s) of appliance 102. The resistance of the coil of relay K1 and other elements of the circuit (e.g., the resistance of resistor R1) may be configured so that the current flowing through the coil of relay K1 is small enough that the contacts of relay K1 stay open. After opening switch S1, the contacts of relay K1 will remain open.

The value of resistor R1 may also be selected to reduce the amount of power that reaches appliance 102 when switch S1 is temporarily in the closed state. Where the resistance of R1 is larger than the resistance of the operating elements of appliance 102, then the amount of energy received by appliance 102 will be less during the time that switch S1 is closed. In some implementations, other circuitry may be used in place of resistor R1. For example, resistor R1 may be replaced by circuitry that increases load and controls the amount of current that is provided to relay K1 based on the measured impedance of the connected appliance.

FIG. 7B illustrates an example of a circuit that may be used with an appliance that has a four-wire power cord. The operation of FIG. 7B is similar to that of FIG. 7A. Instead of operating between a hot wire and a neutral, however, the circuit of FIG. 7B operates between the two hot wires of the four-wire cord. In addition, the relay K1 is replaced by two relays, relay K2 for one hot wire and relay K3 for the other hot wire. Switch S1 is replaced by a double pole switch S3 that controls both hot wires, and switch S2 is replaced by switch S4. Resistor R1 is replaced by two resistors, resistor R2 for one hot wire and R3 for the other hot wire.

The operation of the circuit of FIG. 7B is generally the same as the circuit of FIG. 7A. Switch S4 is generally closed and switch S3 is generally open. Switch S4 may be temporarily opened to change the contacts of relays K2 and K3 from a closed position to an open position. Switch S3 may be temporarily closed to attempt to change the contacts of relays K2 and K3 from an open position to a closed position. For the same reasons as described above, temporarily closing switch S3 will only cause the contacts of relays K2 and K3 to open if all the controls of appliance 102 are in an off position.

FIG. 7C illustrates another example of a circuit that may be used with an appliance that has a four-wire power cord. The operation of FIG. 7C is also similar to that of FIG. 7A. The relay K1 is replaced by two relays, relay K4 for one hot wire and relay K5 for the other hot wire. Switch S1 is replaced by a double pole switch S5 that controls both hot wires, and switch S2 is replaced by switch S6. Resistor R1 is replaced by two resistors, resistor R4 for one hot wire and R5 for the other hot wire.

The operation of the circuit of FIG. 7C is generally the same as the circuit of FIG. 7A. Switch S6 is generally closed and switch S5 is generally open. Switch S6 may be temporarily opened to change the contacts of relays K4 and K5 from a closed position to an open position. Switch S5 may be temporarily closed to attempt to change the contacts of relays K4 and K5 from an open position to a closed position. For the same reasons as described above, temporarily closing switch S5 will only cause the contacts of relays K4 and K5 to open if all the controls of appliance 102 are in an off position.

As with the circuit of FIG. 7A, the circuits of FIGS. 7B and 7C may use other circuitry in place of resistors R2, R3, R4, and R5.

The circuits of FIGS. 7A-C are illustrative and not limiting. Other implementations are possible. Components of FIGS. 7A-C may be modified or replaced with other components that provide similar functionality.

In some implementations, a state of switch 630 may be determined by determining a state of operation of the appliance 102 in other ways. Instead of a sensor measuring a flow of electricity, a sensor may be used to measure the temperature of burner 620. If the temperature of burner 620 is greater than a threshold, then it may be determined that switch 630 is closed. Other examples include but are not limited to sensors that may be used to determine the position of manual control 640 (e.g., using a camera and image processing techniques to determine that manual control 640 is in an on position), sensors that determine the power usage of individual burners, infrared sensors or imagers that may be used to detect light or heat, or flame sensors that determine whether a gas stove or burner is active.

FIG. 6 shows an exemplary system and other systems are possible. In some implementations, appliance assistant 610 is not a separate device and may be incorporated into appliance 102. For example, a manufacturer of appliance 102 may desire to sell appliances with the functionality of appliance assistant 610. The order of relay 220, switch 630, and electrical sensor 111 may be in any functional order. For example, electrical sensor 111 may be between burner 620 and switch 630 or the position of relay 220 and switch 630 may swapped.

The techniques described above may also be used with appliances that are powered by means other than electricity (or in addition to electricity), such as appliances powered by fuel (e.g., natural gas or propane), using techniques known to one of skill in the art. For example, electrical sensor 111 may be replaced by a fuel flow sensor, relay 220 may be replaced by a valve, and switch 630 may be replaced by a valve.

Figure 8:
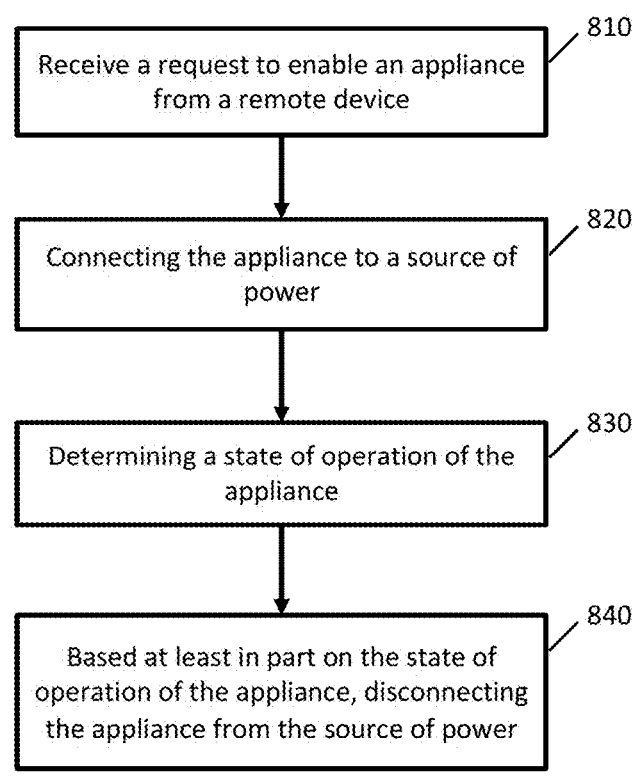
FIG. 8 is a flowchart illustrating an example implementation of remotely enabling an appliance.

FIG. 8 is a flowchart illustrating an example implementation of remote enablement of an appliance. In FIG. 8, the ordering of the steps is exemplary and other orders are possible, not all steps are required and, in some implementations, some steps may be omitted or other steps may be added. The process of the flowcharts may be implemented, for example, by any of the devices or systems described herein.

At step 810, a request to enable an appliance is received from a remote device. The request may be received by an appliance assistant, such as any of the appliance assistants described herein. The remote device may be, for example, a mobile device, such as a smart phone. The user of the remote device may send the request using any appropriate techniques, such as opening an application on the mobile device and selecting a user interface control (e.g., a button) to cause a message to be sent to an appliance assistant. The message may be in any appropriate format, such as a REST API call.

At step 820, the appliance is connected to a source of power. For example, a relay may be closed to connect the appliance to a source of electricity or a valve may be opened to allow fuel to flow to the appliance.

At step 830, a state of operation of the appliance is determined. Any appropriate techniques may be used to determine a state of operation of the appliance. For example, an electrical sensor may be used to measure electricity usage of the appliance, a fuel flow sensor may be used to measure the flow of fuel to the appliance, or other sensors may be used to detect the operation of the appliance. For example, where the appliance is an electric stove, heat sensors may be used to measure heat emitted from a burner of the stove to determine that the burner is on and producing heat.

At step 840, the appliance is disconnected from the source of power based at least in art on the state of operation of the appliance. The appliance may be disconnected from the source of power to prevent an unsafe situation. For example, where the appliance is a stove and a control of the stove has been left in an on position, connecting the stove to a power source may cause the stove to generate heat and potentially create a fire if no one is present. In some implementations, the appliance may be disconnected from the source of power if the appliance is consuming any power or is consuming more than a threshold amount of power. The appliance may be disconnected from the source of power, for example, by opening a relay or closing a valve.

In some implementations, steps 830 and 840 may be performed simultaneously or nearly simultaneously using any of the circuits described above.

In some implementations, an appliance assistant may have features as described in the following clauses, combinations of any two or more of them, or in combination with other clauses presented herein.

1. A method for controlling remote enablement of an appliance, comprising:
   receiving a request from a remote device to enable functionality of the appliance;
   connecting the appliance to a source of power;
   determining a state of operation of the appliance; and
   based at least in part on the state of operation of the appliance, disconnecting the appliance from the source of power.
2. The method of clause 1, wherein determining the state of operation of the appliance comprises measuring electricity usage with a sensor.
3. The method of clause 1, wherein the appliance is a stove and determining the state of the appliance comprises measuring temperature with a sensor.
4. The method of clause 1, wherein determining the state of the appliance comprises measuring a flow of fuel with a sensor.
5. A system for controlling remote enablement of an appliance comprising:
   a relay, wherein the relay is operable to be controlled by a remote user;
   a switch, wherein the switch is operable to be controlled by a user local to the powered device;
   a sensor;
   one or more modules configured to perform operations comprising:
      receiving a request from a remote device to enable functionality of the appliance;
      causing the relay to be closed;
      determining a state of operation of the appliance using the sensor;
      based at least in part on the state of operation of the appliance, causing the relay to be opened.
6. The system of clause 5, wherein the sensor measures temperature, a flow of electricity, or gas flow.
7. A circuit for controlling power to an appliance, the circuit comprising:
   a relay, wherein a first contact of the relay is electrically connected to a hot wire of a power source and a second contact of the relay is electrically connected to a hot wire of an appliance;
   a first switch; and
   a second switch;
   wherein, the circuit is configured so that:
      a coil of the relay is electrically connected to the hot wire of the power source when the first switch is closed or the first contact of the relay is in contact with the second contact of the relay;
      the coil of the relay is not electrically connected to a second wire of the power source when the second switch is open.
8. The circuit of clause 7, wherein:
   the circuit comprises a second relay, wherein a first contact of the second relay is electrically connected to a second hot wire of a power source and a second contact of the second relay is electrically connected to a second hot wire of an appliance;
   the first switch is a single throw double pole switch; and
   the second wire is the second hot wire of the power source.
9. A method for controlling power to an appliance using a circuit comprising a first switch, a second switch, and a relay, the method comprising:
   receiving a request to connect the appliance to a power source;
   in response to receiving the request to connect the appliance to the power source, closing and then opening the first switch, wherein closing the first switch creates an electrical connection between a hot wire of the power source and (i) a coil of the relay and (ii) the appliance;
   receiving a request to disconnect the appliance from the power source;
   in response to receiving the request to disconnect the appliance from the power source, opening and then closing the second switch, wherein opening the second switch causes an electrical connection between the coil of the relay and a second wire of the power source to be broken.
10. The method of clause 9, wherein closing the first switch causes the contacts of the relay to close only if the appliance is off.
11. The method of clause 9, wherein:
    the circuit comprises a second relay;
    closing the first switch creates an electrical connection between a second hot wire of the power source and a coil of the second relay;
    opening the second switch causes an electrical connection between the coil of the second relay and the first hot wire of the power source to be broken.

Multiple Appliance Assistants

In some implementations, multiple appliance assistants may be present where each appliance assistant is connected to a different appliance. The multiple appliance assistants may be connected to one or more computers to assist in the operation of the appliance assistants. For example, the appliance assistants may be used in a hotel, an apartment building, a dormitory, or an assisted living center, where an appliance assistant is used in each room (e.g., for a stove in each room).

Figure 9:
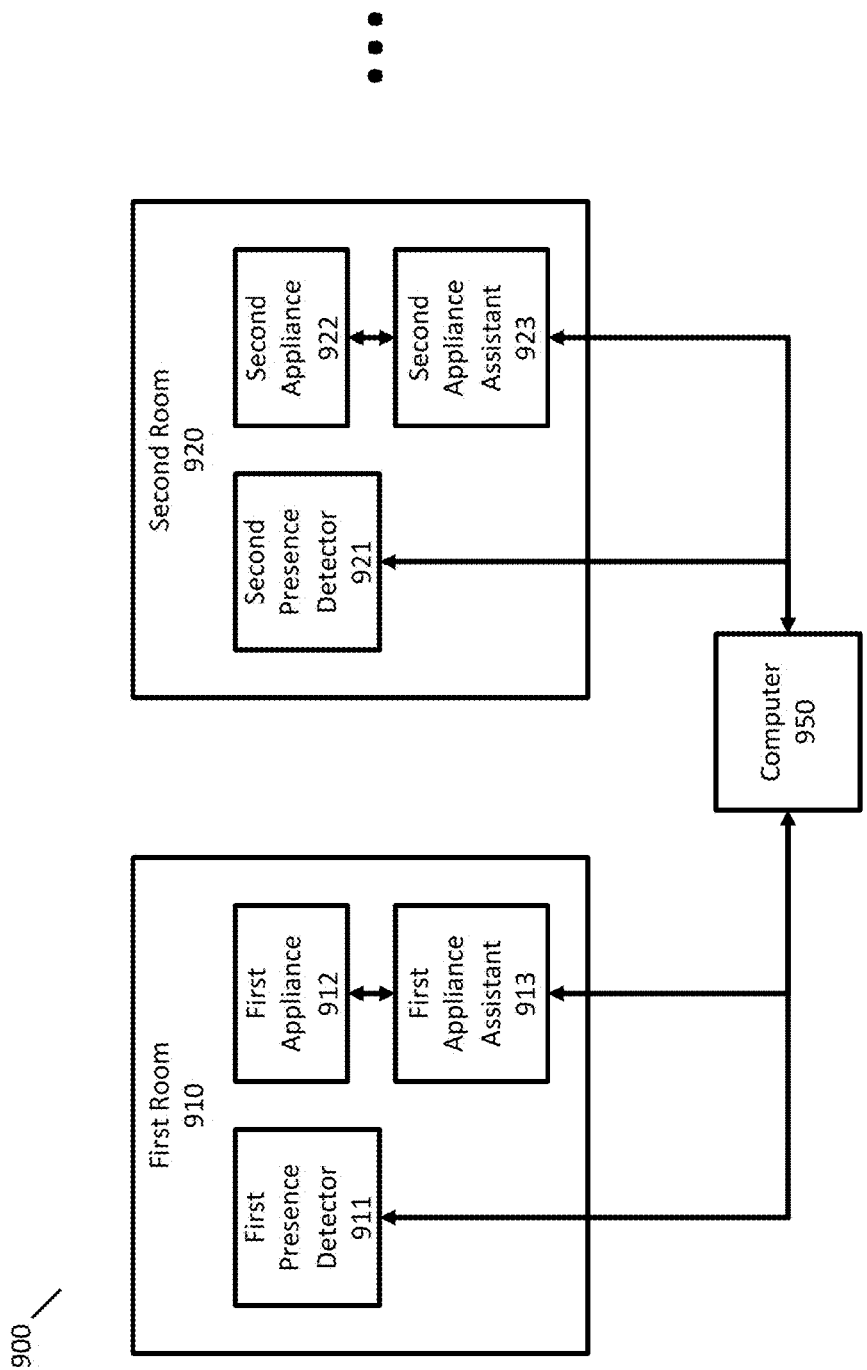
FIG. 9 is an example system with multiple appliance assistants.

FIG. 9 illustrates an example of a system of multiple appliance assistants. In FIG. 9, two rooms are illustrated with an ellipsis indicating that the system may include any number of rooms. FIG. 9 includes a first room 910, with a first appliance 912, a first appliance assistant 913, and a first presence detector 911. Similarly, FIG. 9 includes a second room 920, with a second appliance 922, a second appliance assistant 923, and a second presence detector 921. First room 910 and second room 920 may be, for example, two rooms of a hotel.

First appliance 912 and second appliance 922 may be any appliance that may be found in a home, hotel, apartment building, dormitory, or an assisted living center, such as a stove.

First appliance assistant 913 and second appliance assistant 923 may include any of the components and features of the appliance assistants described herein. In some implementations, first appliance assistant 913 and second appliance assistant 923 may be a more limited version of appliance assistant 210. For example, in some implementations, first appliance assistant 913 and second appliance assistant 923 may not include processor 113, speaker 116, or microphone 117. In some implementations, first appliance assistant 913 and second appliance assistant 923 may have only a wired network interface (e.g., wired Ethernet or a phone line) and may not have a wireless network interface.

First presence detector 911 and second presence detector 921 may be any device that may be used to determine the presence of a person in the respective room. For example, a presence detector may be implemented by a motion sensor, a body heat sensor, a wireless network interface the determines the presence of mobile devices (e.g., whether or not a mobile device is connected to a local Wi-Fi network). In some implementations, first presence detector 911 may be implemented by a mobile device of a person, such as an application running on the mobile device, and in some implementations, first presence detector 911 may be built into first appliance assistant 913.

First appliance assistant 913 and first presence detector 911 may work together to control first appliance, such as by disconnecting first appliance 912 from a power source when it is determined that people are not present in first room 910. In some implementations, first presence detector 911 and first appliance assistant 913 may not communicate directly with one another and may instead communicate via computer 950. Computer 950 may be any computer that is able to communicate with first presence detector 910 and first appliance assistant 913, such as a personal computer, server computer, or mobile device. In some implementations, computer 950 may be in a room other than first room 910 and may communicate with other presence detectors and appliance assistants, such as those of second room 920.

Computer 950 may be configured to control first appliance 912 via first appliance assistant 913. In some implementations, computer 950 may be configured to disconnect first appliance 912 from a power source to prevent dangerous situations, such as when first appliance 912 is a stove and it is determined that no people are present in first room 910.

Computer 950 may communicate with first presence detector 911 to obtain information about the presence of people in first room 910. Each of computer 950 and first presence detector 911 may have one or more of processors and network interfaces to communicate information with each other. In some implementations, computer 950 may request presence information from first presence detector 911 on a periodic basis (e.g., every 5 minutes) or on a periodic basis when first appliance 912 is on. In some implementations, presence detector 911 may periodically transmit presence information to computer 950, may only transmit information when people are not present, or may only transmit information when people are present. First presence detector 911 may transmit raw data (e.g., as received from a sensor) or may process the sensor data and transmit processed data (e.g., a determination that a person is present or not).

Computer 950 may communicate with appliance assistant 913 to obtain information about first appliance 912 and/or to control first appliance 912, such as by disconnecting it from a power source. Each of computer 950 and first appliance assistant 912 may have one or more of processors and network interfaces to communicate information with each other. In some implementations, computer 950 may request information about the operational state of first appliance 912 (e.g., whether first appliance 912 is on or off) from first appliance assistant 913 on a periodic basis (e.g., every 5 minutes) or on a periodic basis when no people are present in first room 910. In some implementations, appliance assistant 913 may periodically transmit information about the operational stat of first appliance 912 to computer 950, may only transmit information when first appliance is on, or may only transmit information when first appliance is off. First appliance assistant 913 may transmit raw data (e.g., as received from a sensor) or may process the sensor data and transmit processed data (e.g., a determination that first appliance is on or off).

A determination to disable first appliance 912 may be determined by either computer 950 or first appliance assistant 913. In some implementations, computer may receive presence information from first presence detector 911, receive information about the operational state of first appliance 912 from first appliance assistant 913 and determine to disable the appliance. For example, if first appliance 912 is on and no one is in the room or no one has been on the room for longer than a threshold period of time (e.g., setting a timer when it is determined that no one is in the room and determining to disable the appliance upon the expiration of the timer). In some implementations, first appliance assistant 913 may receive presence information from first presence detector 911 via computer 950 and determine to disable first appliance 912.

After first appliance 912 has been disabled by first appliance assistant 913, it may later be determined to reenable first appliance 912. First appliance 912 may be reenabled using any of the techniques described herein, such as reenabling from a mobile device, causing a mobile device to play a sound in the vicinity of the first appliance assistant 913, disconnecting and reconnecting first appliance assistant 913 to a power source, or pushing a button on first appliance assistant 913.

Second presence detector 921, second appliance assistant 923, and second appliance 922 may provide the same functionality for second room 920. Similarly, other rooms may also have appliances, presence detectors, and appliance assistants and provide the same functionality for other rooms.

Figure 10:
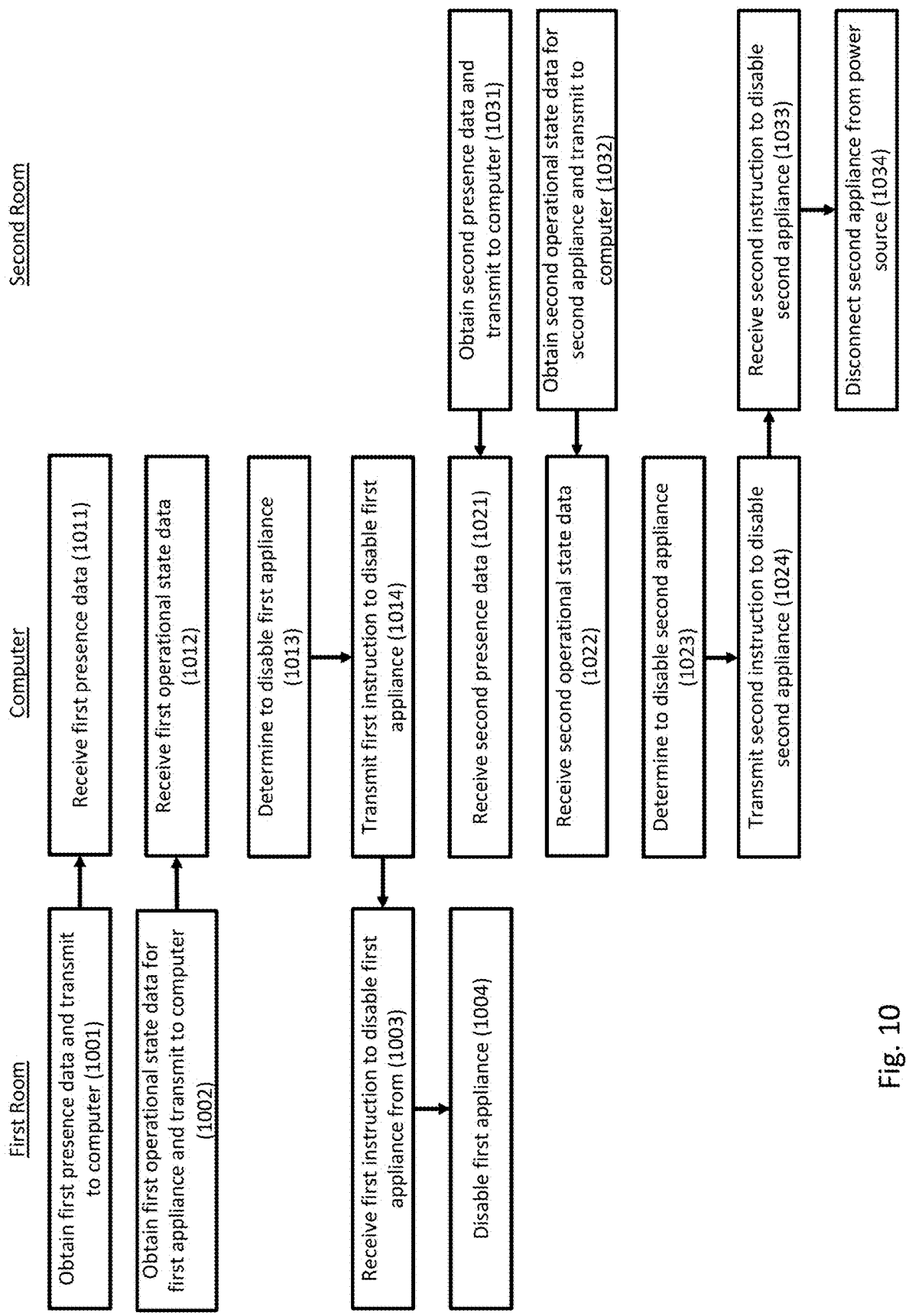
FIG. 10 is a flowchart illustrating an example implementation of operating multiple appliance assistants.

FIG. 10 is a flowchart illustrating an example implementation of multiple appliance assistants. In FIG. 10, the ordering of the steps is exemplary and other orders are possible, not all steps are required and, in some implementations, some steps may be omitted or other steps may be added. The process of the flowcharts may be implemented, for example, by any of the devices or systems described herein.

At step 1001, first presence data is obtained in a first room. For example, the presence data may be obtained by a sensor device, such as a device with a motion sensor or a wireless network interface. The first presence data may be raw data obtained from a sensor or processed data, such as a determination whether a person is present in the first room or not. The first presence data is transmitted to a computer, which may be in a different room. At step 1011, the first presence data is received at the computer. The transmission of the presence data may be initiated by either the sensor device or the computer.

At step 1002, first operational state data for a first appliance is obtained in a first room. For example, an appliance assistant connected to an appliance may determine the operational state of the appliance using an electrical sensor or a fuel sensor. The first operational state data may be raw data obtained from a sensor or processed data, such as a determination whether the appliance is on or off. The first operational state data is transmitted to the computer. At step 1012, the first operational state data is received at the computer. The transmission of the operational state data may be initiated by either the appliance assistant or the computer. Step 1001 and step 1002 may be in any order or performed simultaneously.

At step 1013, it is determined to disable the first appliance, such as by disconnecting the first appliance from a power source. The determination may be made using any of the techniques described herein, such as disabling the appliance if no people are in the first room. At step 1014, a first instruction is transmitted to the first room, such as to an appliance assistant in the first room. At step 1003, the first instruction is received at the first room, and at step 1004, the appliance is disabled. For example, the appliance may be disabled by opening a relay in appliance assistant that disconnects the appliance from a source of electrical power or closing a valve that disconnects the appliance from a source of fuel.

At steps 1031, 1021, 1032, 1022, 1023, 1024, 1033, and 1034, similar operations are performed for a second room. The steps for the second room need not be performed after the step of the first room, and the steps for the two rooms may be intermingled so that the computer is interacting with both rooms simultaneously.

In some implementations, an appliance assistant may have features as described in the following clauses, combinations of any two or more of them, or in combination with other clauses presented herein.

1. A system comprising:
    an appliance assistant connected to a power source and an appliance, the first appliance assistant comprising:
        an electrical sensor, wherein the electrical sensor measures electricity provided to the appliance;
        a relay;
        a first network interface;
        a processor configured to:
            determine an operating state of the appliance using data obtained from the electrical sensor,
            transmit an indication of the operational state to a remote computer via the network interface,
            receive an instruction from the remote computer to disconnect the appliance from a power source,
            open the relay to disconnect the appliance from the power source, and
            transmit an indication to the remote computer that the relay is open;
    a sensor device located in the vicinity of the appliance, the sensor device comprising:
        a second network interface;
        a motion sensor;
        a processor configured to transmit an indication to the remote computer using data obtained from the motion sensor;
    the remote computer configured to:
        receive the indication from the sensor device;
        receive the indication that the appliance is on;
        determine to disconnect the appliance from the power source;
        transmit an instruction to the appliance assistant to disconnect the appliance from the power source;
        receive an indication from the first device that the relay is open.

2. The system of clause 1, wherein the appliance assistant and the sensor device are in a hotel room and the remote computer is not in the hotel room.
3. The system of clause 1, wherein the appliance assistant does not include human input devices and does not include human output devices.
4. The system of clause 1, wherein the appliance assistant comprises circuitry configured to close the relay in response to the appliance assistant being disconnected from a power source and then reconnected to the power source.
5. The system of clause 1, wherein the appliance assistant is disconnected from a power source and then reconnected to the power source by a person opening and closing a circuit breaker.
6. A method for controlling the operation of a plurality of appliances in a plurality of rooms, the method comprising:
    receiving first presence data indicative of the presence of a person in a first room;
    receiving an indication of an operational state of a first appliance in the first room is on from a first appliance assistant connected to the first appliance;
    determining to disconnect the first appliance from a first power source;
    transmitting an instruction to the first appliance assistant to disconnect the first appliance from a first power source;
    receiving second presence data indicative of the presence of a person in a second room;
    receiving an indication of an operational state of a second appliance in the second room is on from a second appliance assistant connected to the second appliance;
    determining to disconnect the second appliance from a second power source; and
    transmitting an instruction to a second appliance assistant to disconnect the second appliance from a second power source.
7. The method of clause 6, wherein the first room and second rooms are hotel rooms.
8. The method of clause 6, wherein determining to disconnect the first appliance from the first power source comprises determining that the first presence data indicates that people are not in the room.
9. The method of clause 6, wherein determining to disconnect the first appliance from the first power source comprises:
    determining that the first presence data indicates that people are not in the room;
    setting a timer; and
    determining to disconnect the first appliance from the first power source in response to the expiration of the timer.
10. The method of clause 6, wherein the first presence data comprises data obtained from a motion sensor or data obtained from a wireless network interface.

Adaptive Appliance Assistant

In some implementations, the appliance assistant may be configured to learn an individual's or a household's typical behavior in using an appliance and modify its configuration to provide improved functionality. For example, the duration of any of the timers described herein may be adapted to match typical usage of the appliance.

Typical usage of an appliance may be learned over time as the appliance is used. For example, every time the appliance is used, data such as an operational state of the appliance (e.g., on or off, or an indication of specific functionality, such the oven was on or the left, front burner was on), start time, duration, and/or end time may be recorded. Other information may be recorded as well, such as identifiers of nearby mobile devices during usage of the appliance, the day of the week, the day of the month, the month of the year, weather, and location (which may be constant for a fixed appliance, such as a stove). Personal information may also be collected, such as birth date, age, gender, ethnicity, etc.

The collected data may be used to create models that describe the typical usage of the appliance. A model may be created for all users of the appliance, models may be created for individual users of the appliance (as determined from mobile device identifiers), and/or for specific modes of operation of the appliance (e.g., the oven may be used differently from burners). Any appropriate model may be used to model appliance usage, such as histograms or Gaussian mixture models.

In some implementations, a bucket model may be used. A 24-hour period may be divided into multiple buckets. For example, 24 buckets may be used where each hour corresponds to a bucket. In another example, where the appliance relates to cooking, three buckets may be used where each bucket corresponds approximately to a meal (e.g., breakfast, lunch, or dinner). For the three bucket example, the times corresponding to the bucket may be adapted to a specific model, and the three buckets may partition a 24-hour period. For example, a breakfast bucket may correspond to 2:00 AM to 10:00 AM, a lunch bucket may correspond to 10:00 AM to 4:00 PM, and a dinner bucket may correspond to 4:00 PM to 2:00 AM.

Each bucket may have parameters that describe cooking behavior corresponding to the bucket. For example, each bucket may have a first parameter corresponding to an average cooking duration during the bucket and a second parameter indicating a standard deviation of cooking durations during the bucket.

The number of buckets, the time periods corresponding to each bucket, and the parameters of each bucket may be learned or trained from the collected data. For example, a clustering algorithm, such as k-means, may be used to cluster the collected data into buckets and then determine the parameters of each bucket.

In some implementations, the domain of a bucket may include dimensions other than time. For example, use of an appliance may be different for week days and weekends, and additional buckets may be created to better model appliance usage. Three buckets may be used to model week days and three buckets may be used to model weekends. Any of the data collected, as described above, may be used as an additional dimension for a bucket domain, such as day of the month, month of the year, weather, or location.

When a person is using an appliance, the operation of the appliance assistant may be adapted based on the learned typical usage of the appliance. For example, the appliance assistant may set a safety timer when a person starts using the appliance, and then send a notification or disable the appliance upon the expiration of the safety timer. The duration of the safety time may be adapted based on the typical usage of the appliance and/or the person using the appliance as determined by a mobile device that is near the appliance. For example, when an appliance is turned on, the duration of the safety timer may be set using the current time of day. For example, a bucket may be obtained that corresponds to the time of day. A mean and standard deviation may be obtained that correspond to cooking durations in that bucket. In some implementations, the safety time may be set to a number of standard deviations above the mean, such as two standard deviations above the mean. For example, if the mean cooking time is 15 minutes and the standard deviation of cooking time is 2 minutes, the safety timer may be set to 19 minutes.

Figure 11:
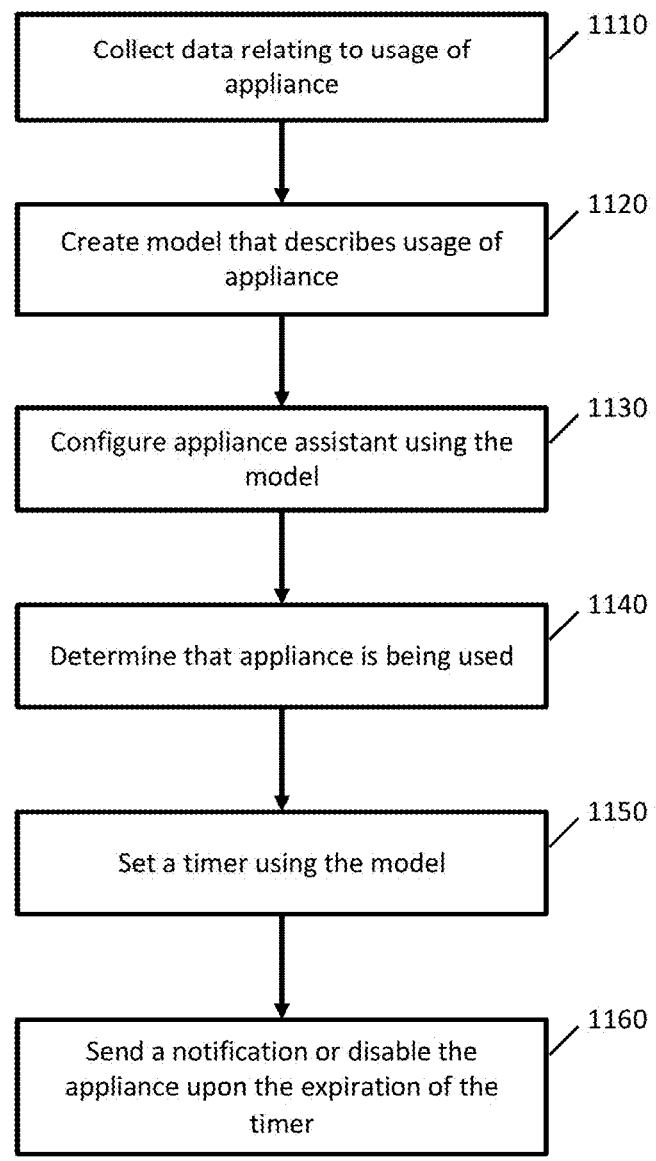
FIG. 11 is a flowchart illustrating an example implementation of an adaptive appliance assistant.

FIG. 11 is a flowchart illustrating an example implementation of an adaptive appliance assistant. In FIG. 11, the ordering of the steps is exemplary and other orders are possible, not all steps are required and, in some implementations, some steps may be omitted or other steps may be added. The process of the flowcharts may be implemented, for example, by any of the devices or systems described herein.

At step 1110, data is collected relating to usage of the appliance. The collected data may include any of the data described herein, such as start time, duration, end time, and/or a type of usage of the appliance (e.g., burner vs. oven of a range). At step 1120, a model is created that describes usage of the appliance, and the model may be created using the collected data. For example, the model may be a bucket model, and a number of buckets, the start and end time of each bucket, and statistics of cooking time for each bucket may be determined using the collected data. In some implementations, models may be created for different users of the appliance, and the user of the appliance may provide an indication before using the appliance (e.g., logging in) or the user may be determined from mobile devices as described herein.

At step 1130, an appliance assistant is configured using the model. For example, an appliance assistant may set timers using the model. At step 1140, it is determined that an appliance is being used. For example, an appliance assistant may use an electrical sensor or fuel sensor to determine that the appliance is being used. At step 1150, a timer is set using the model. For example, a timer may be set in response to the appliance being turned on or in response to users leaving the vicinity of the appliance while the appliance is on. A duration of the timer may be set using the model, such as by determining a bucket corresponding to the current time and determining a timer duration using a mean and standard deviation corresponding to the bucket. In some implementations, a model may be selected according to the current user of the appliance. For example, the user of the appliance may be determined using a mobile device, as described herein. At step 1160, a notification is sent and/or the appliance is disabled upon the expiration of the timer. For example, a notification may be sent to one or more users using any of the techniques described above, or the appliance may be disabled, such as by disconnecting the appliance from a power source.

Steps of the process above may be repeated to improve the performance of an adaptive appliance assistant. For example, after a first model is created, additional data may be collected relating to usage of the appliance and this additional data and the previously collected data may be combined to create a second model that more accurately describes usage of the appliance than the first model. The appliance assistant may then be configured with the second model.

The operation of the appliance assistant with the model may be performed entirely on the appliance assistant or may be a combination of some operations performed on the appliance assistant and some operations performed by a server. For example, where the appliance assistant does not have a network connection it may be preferred to have all operations performed by the appliance assistant. Where the appliance assistant does have a network connection, some operations may be performed by a server and this may allow for additional processing and more complex models.

Example System with Appliance Assistant

Figure 12:
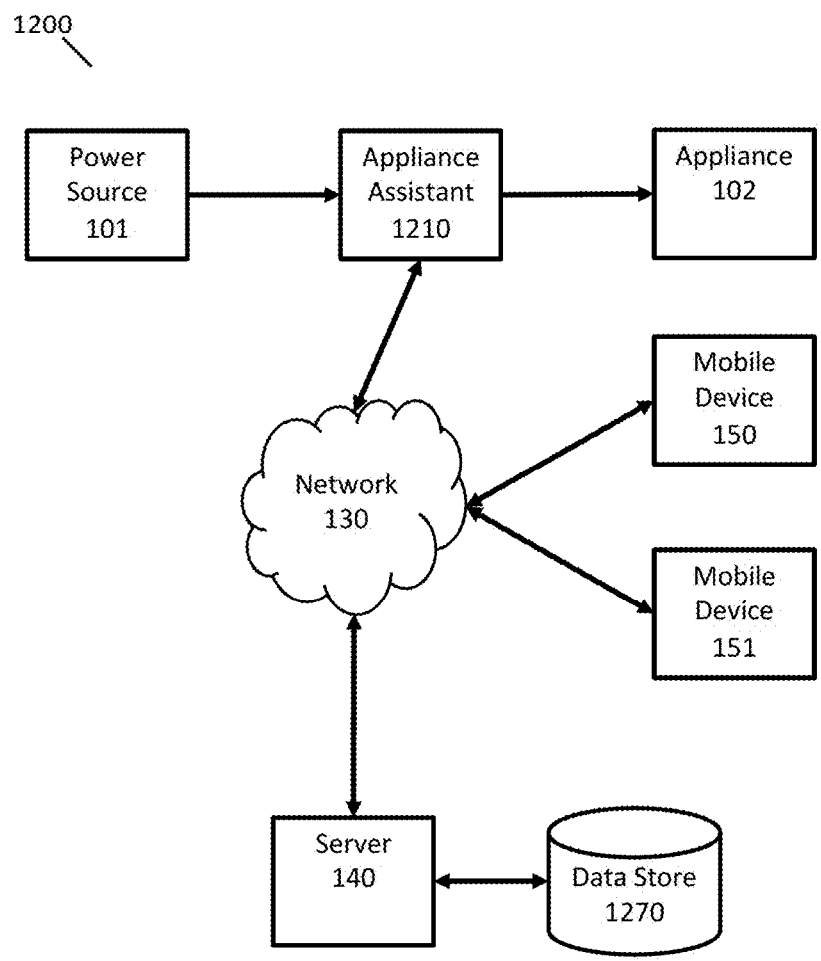
FIG. 12 is an example of a system for using an appliance assistant in conjunction with an appliance.

FIG. 12 illustrates an exemplary system 1200 for using an appliance assistant 1210 in conjunction with an appliance 102. In FIG. 12, appliance assistant 1210 is connected to power source 101 and appliance 102, as described above. Appliance assistant 1210 may have any of the components and functionality of any of the appliance assistants described herein, and may have additional components and functionality. System 1200 may have multiple mobile devices, such as mobile device 150 and mobile device 151.

In the example of FIG. 12, a person may configure appliance assistant 1210 to operate with one more users, such as a family or multiple people living in a house. A user, such as the person who purchased the appliance assistant, may configure the appliance assistant to operate with the one or more users. For example, the user configuring the appliance assistant may provide information about the other users, such as names, telephone numbers, email addresses, or any other personal information. Each user may then configure their mobile devices to operate in conjunction with appliance assistant 1210. For example, each user may receive an invitation via email or text message, and install an application on their mobile device that allows the mobile device to operate in conjunction with appliance assistant 1210.

A configuring user or each individual user may set permissions and/or preferences relating to appliance assistant 1210. For example, some users may be able to configure appliance assistant 1210, some users may be able to set preferences, and some users may not be able to configure and may not be able to set preferences. Preferences may include any of the information described above, such as durations of timers, access to use appliances, and receiving notifications.

A profile may be created for each user. For example, software running on server 140 may create profiles for each user and store the profiles in data store 1270. The profile of a user may include any relevant information about a user, such as any personal information (name, age, etc.), a location of the user, an identifier of the user or a mobile device of the user, preferences, and permissions. As used herein, a "profile" comprises any format for storing information about a person in a data store and is not limited to any particular structure or organization. Data store 1270 may use any known storage technology such as files or relational or non-relational databases In some implementations, software running on server 140 may keep track of locations of mobile devices of the users. For example, a mobile device may transmit location information to server 140 on request, on a periodic basis, when the mobile device moves more than a specified amount, or when a mobile device moves in relation to appliance 102. For example, a mobile device may periodically compare its location to appliance 102 and send a message to server 140 when a change in location of the mobile device with respect to appliance 102 changes by more than a specified threshold.

In some implementations, a mobile device may transmit location information when the mobile device moves out of a vicinity of the appliance or moves into the vicinity of the appliance. For example, a mobile device may be in the vicinity of appliance 102 when the distance between the mobile device and appliance 102 is less than a threshold, and the mobile device may not be in the vicinity of appliance 102 when the distance between the mobile device and appliance 102 is greater than a threshold. A mobile device may send a message to server 140 when its status changes, such as changing from being in the vicinity of appliance 1020 to not being in the vicinity of appliance 102 or vice versa.

Server 140 may receive location information from mobile devices and update user profiles based on the received information. For example, a user profile may store latitude and longitude information indicating a location of a user's mobile device or may store a true or false value indicating whether the user's mobile device is in the vicinity of the appliance 102 or not.

A configuring user or other use may provide the location of appliance 102. The location of appliance 102 may be specified in any suitable way. For example, a user may provide an address where appliance 102 is located, may indicate on a map where appliance 102 is located, or may stand next to appliance 102 and select a user interface control to set the location of appliance 102 based on the current location of the user's mobile device. The location of appliance 102 may be stored in any suitable location, such as appliance 102, a mobile device, server 140, or data store 1270 (e.g., in an appliance profile or a profile of a user).

Figure 13:
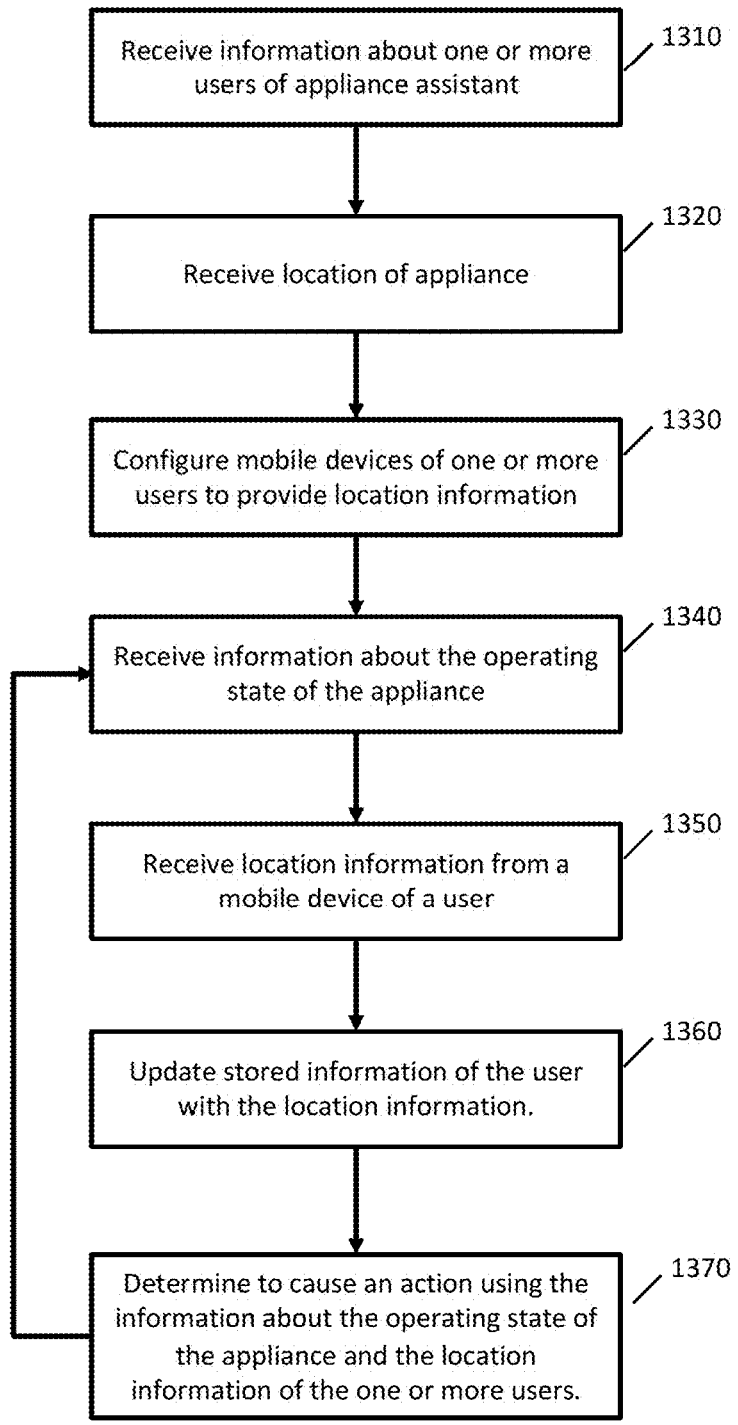
FIG. 13 is a flowchart illustrating an example implementation of an appliance assistant receiving location information from mobile devices.

FIG. 13 is a flowchart illustrating an example implementation of an appliance assistant. In FIG. 13, the ordering of the steps is exemplary and other orders are possible, not all steps are required and, in some implementations, some steps may be omitted or other steps may be added. The process of the flowcharts may be implemented, for example, by any of the devices or systems described herein, such as server 140.

At step 1310, information is received about one or more users of appliance assistant 1210. For example, a user may provide information about himself and other users using an application on a mobile device. The provided information may include any of the information described herein. In some implementations, a profile may be created for each user. For example, server 140 may receive the information, create a profile for each user, and store the profile in data store 1270.

At step 1320, a location of the appliance is received. For example, a user may provide the location using an application on a mobile device, and may provide the location using any of the techniques described herein. In some implementations, the location information may be processed before being used. For example, a user may provide first location information (e.g., an address) and the first location information may be converted to second location information (e.g., determining a latitude and longitude from an address). In some implementations, server 140 may receive the location and store it in data store 1270 and/or transmit the location to mobile devices of the users.

At step 1330, mobile devices of the users are configured to transmit location information, such as by transmitting location information to server 140. In some implementations, each user will install an application on their mobile device, and the application will configure the mobile device to transmit location information to server 140. The location information may include an absolute location of the mobile device (e.g., latitude and longitude), a relative location (e.g., a distance between the mobile device and the appliance), declarative information (e.g., whether the location of the mobile device meets a location criterion, such as whether the mobile device is in the vicinity of the appliance or with a certain distance of the appliance), or any other information corresponding to the location of the mobile device. Mobile devices may transmit location information at any appropriate times or intervals, as described above (e.g., every 5 minutes or if the location changes by more than a threshold amount).

At step 1340, information about the operating state of the appliance is received from appliance assistant 1210. For example, server 140 may receive information corresponding to an amount of power or energy being consumed by appliance 102 or an indication of whether appliance 102 is on or off (or in some other state, such as 50% on). In some implementations, server 140 may store the information about the operating state, such as by storing the information in an appliance profile or a user profile in data store 1270. Information about the operating state of the appliance may be received at any appropriate times or intervals, as described above (e.g., every 5 minutes or if the operating state changes).

At step 1350, location information is received from a mobile device, such as any of the location information described herein. For example, the location information may indicate whether the mobile device is within the vicinity of appliance 102.

At step 1360, the received location information is stored. For example, server 140 may receive the location information and store it in a profile of the user of the mobile device, such as a user profile stored in data store 1270.

At step 1370, it is determined whether to cause an action to be performed using the information about the operating state of the appliance and the location information of the users. Any of the actions described herein may be performed (e.g., sending notifications or disabling the appliance) and the determination may be made using any of the techniques described herein. For example, after all users have left the vicinity of appliance 102, a timer may be set, and the action may be performed upon the expiration of the timer. After determining to cause an action, the action may be performed. For example, server 140 may cause a notification to be sent to one or more mobile devices or may cause appliance assistant 1210 to disable appliance (such as by disconnecting it form a power source).

Steps 1340, 1350, 1360, and 1370, may be repeated any order, may operate on a continuous basis, and/or may operate on a continuous basis whenever appliance is in a particular operating state (e.g., appliance 102 is not off).

In some implementations, an appliance assistant may have features as described in the following clauses, combinations of any two or more of them, or in combination with other clauses presented herein.

1. A system for monitoring or controlling an appliance, the system comprising:
   an appliance connected to a power source;
   an appliance assistant, wherein the appliance assistant comprises:
      a power supply sensor that measures data corresponding to an amount of power provided to an appliance,
      a first network interface, and
      one or more processors configured to transmit, via the first network interface, information corresponding to an operational state of the appliance;
   a plurality of mobile devices comprising a first mobile device, wherein the first mobile device comprises:
      a sensor that measures data corresponding to a location of the first mobile device,
      a second network interface, and
      one or more processors configured to (i) determine that the first mobile device is not in the vicinity of the appliance using the data corresponding to the location of the first mobile device, and (ii) transmit, via the second network interface, first information indicating that the first mobile device is not in the vicinity of the appliance;
   a server computer comprising one or more processors configured to:
      receive, from the appliance assistant, the information corresponding to the operational state of the appliance,
      receive, from the first mobile device, the first information indicating that the first mobile device is not in the vicinity of the appliance,
      determine to cause an action to be performed using the information corresponding to the operational state of the appliance and the first information indicating that the first mobile device is not in the vicinity of the appliance, wherein the action comprises at least one of (i) sending a notification or (ii) disconnecting the appliance from the power source, and
      cause the action to be performed.

2. The system of clause 1, wherein:
   the power supply sensor measures at least one of current, voltage, or a flow of fuel; and
   the information corresponding to the operational state of the appliance comprises an amount of power being consumed by the appliance.

3. The system of clause 1, wherein:
   the sensor that measures data corresponding to a location of the first mobile device comprises at least one of a global positioning system sensor, a network interface for communicating with cell towers, or a network interface for communicating over a wireless local area network; and
   the one or more processors of the first mobile device are configured to determine that the first mobile device is not in the vicinity of the appliance by comparing a location of the first mobile device with a location of the appliance.

4. The system of clause 1, wherein the one or more processors of the first mobile device are configured to:
   receive first appliance location information from a user corresponding to a location of the appliance; and
   store the first appliance location information on the first mobile device or determine second appliance location information using the first appliance location information and store the second appliance location information on the first mobile device.

5. The system of clause 1, wherein the one or more processors of the server computer are configured to:
   set a timer; and
   cause the action to be performed in response to the expiration of the timer.

6. The system of clause 1, wherein the one or more processors of the server computer are configured to:
   cause the first information indicating that the first mobile device is not in the vicinity of the appliance to be stored in a data store;
   receive, from a second mobile device, second information indicating that the second mobile device is not in the vicinity of the appliance;
   cause the second information indicating that the second mobile device is not in the vicinity of the appliance to be stored in the data store;
   determine to cause the action to be performed using the second information indicating that the second mobile device is not in the vicinity of the appliance.

7. The system of clause 1, wherein:
   the power source comprises electricity;
   the appliance assistant comprises a relay; and
   the one or more processors of the appliance assistant are configured to open the relay in response to receiving a message from the server computer.
8. The system of clause 1, wherein:
   the power source comprises fuel;
   the appliance assistant comprises a valve; and
   the one or more processors of the appliance assistant are configured to close the valve in response to receiving a message from the server computer.
9. The system of clause 1, wherein the appliance assistant (i) is an electrical outlet installed in a wall, (ii) includes a plug to be inserted into an electrical outlet and a receptacle to receive a plug of the appliance, or (iii) replaces an electrical cord of the appliance.
10. The system of clause 1, wherein the appliance assistant is integrated into the appliance.
11. The system of clause 1, wherein the one or more processors of the server computer are configured to:
   receive a request from the first mobile device to disable the appliance; and
   send a message to the appliance assistant to cause the appliance assistant to disconnect the appliance from the power source.
12. A method for controlling or monitoring an appliance, the method comprising:
   receiving information corresponding to a plurality of users associated with the appliance, the plurality of users comprising a first user and a second user;
   storing information about each user of the plurality of users;
   receiving, from an appliance assistant, information corresponding to an operational state of the appliance;
   receiving from a first mobile device first location information corresponding to a location of the first mobile device, wherein the first location information indicates a location of the first mobile device or indicates that the first mobile device is not in the vicinity of the appliance;
   updating stored information for the first user using the first location information;
   receiving from a second mobile device second location information corresponding to a location of the second mobile device, wherein the second location information indicates a location of the second mobile device or indicates that the second mobile device is not in the vicinity of the appliance;
   updating stored information for the second user using the second location information;
   determining to perform an action in response to the first location information, the second location information, and the information corresponding to an amount of power being consumed by the appliance, wherein the action comprises at least one of (i) sending a notification or (ii) disconnecting the appliance from the power source; and
   causing the action to be performed.
13. The method of clause 12, wherein:
   the action comprises disconnecting the appliance from the power source; and
   causing the action to be performed comprises sending a message to the appliance assistant to disconnect the appliance from the power source.
14. The method of clause 12, wherein:
   the action comprises sending a notification; and
   causing the action to be performed comprises sending a notification to at least one of the first mobile device or the second mobile device.
15. The method of clause 12, wherein the method comprises:
   receiving, from the first mobile device, notification preferences for the first user; and
   storing the notification preferences in a profile of the first user.
16. The method of clause 12, wherein the method comprises:
   starting a timer; and
   causing the action to be performed in response to expiration of the timer.
17. The method of clause 12, wherein the method comprises:
   receiving an indication from the appliance assistant that the appliance has changed from an off state to an on state; and
   sending a second notification to the first mobile device in response to receiving the indication.
18. The method of clause 12, wherein the method comprises:
   receiving a request from the first mobile device for information about the appliance;
   obtaining the requested information from the appliance assistant; and
   transmitting to the first mobile device the requested information.
19. One or more non-transitory computer-readable media comprising computer executable instructions that, when executed, cause at least one processor to perform actions comprising:
   receiving information corresponding to a plurality of users associated with the appliance, the plurality of users comprising a first user and a second user;
   storing information about each user of the plurality of users;
   receiving, from an appliance assistant, information corresponding to an operational state of the appliance;
   receiving from a first mobile device first location information corresponding to a location of the first mobile device, wherein the first location information indicates a location of the first mobile device or indicates that the first mobile device is not in the vicinity of the appliance;
   updating stored information for the first user using the first location information;
   receiving from a second mobile device second location information corresponding to a location of the second mobile device, wherein the second location information indicates a location of the second mobile device or indicates that the second mobile device is not in the vicinity of the appliance;
   updating stored information for the second user using the second location information;
   determining to perform an action in response to the first location information, the second location information, and the information corresponding to an amount of power being consumed by the appliance, wherein the action comprises at least one of (i) sending a notification or (ii) disconnecting the appliance from the power source; and
   causing the action to be performed.
20. The one or more non-transitory computer-readable media of clause 19, the actions comprising:
   receiving a request from the first mobile device to disable the appliance; and sending a message to the appliance assistant to cause the appliance assistant to disconnect the appliance from the power source.

Data Collection and Applications

In some implementations, data may be collected relating to usage of an appliance and used for other purposes. By monitoring the appliance throughout the day, data may be collected relating to the total amount of time per day (or other time period, such as week, month, or year) that the appliance is used. In addition, a number of uses of an appliance may be recorded. For example, it may be determined that, over the course of a month, an appliance was used a total of 70 times for a total time period of 16 hours with a shortest use of 30 seconds and a longest use of 3 hours.

Information may also be collected regarding energy usage or energy efficiency of appliances. By measuring the current and voltage going into an appliance or the amount of gas or other energy source going into an appliance, the power used by the appliance at any given time or a total amount of energy over a period of time may be determined. Where other information is known, such as the make and/or model of the appliance, the energy efficiency of the application may also be determined. Energy efficiency may be determined for individuals or the entire building by aggregating usage over time and comparing with other similar users or buildings.

In addition to monitoring usage of an appliance, other data relating to the use of the appliance may be collected as well. For example, when people are home, the number of people present and the identities of the people present may be determined by monitoring the presence of mobile devices owned by those people. A number of shutdowns may be recorded along with the reason for the shutdown, such as all people leaving the building, the appliance being on for a long period of time, or a shutdown caused by a remote user.

In some implementations, the collected data may include audio, video, infrared, or any other data that may be used to determine activities of people in the home. For example, audio from a microphone placed near a stove may be processed to determine whether a person is frying food, sautéing food, or boiling water. Similarly, processing image data from a camera near a stove may provide more detailed information, such as the ingredients used, the dish being prepared, and even the cooking style of the person doing the cooking.

The settings and configuration of an appliance assistant may also be recorded. For example, the settings and configuration may include: (i) whether an appliance is configured to automatically shut down after a period of time and, if so, what the period of time is, (ii) if an appliance is configured to shut down when no one is present, (iii) who is receiving notifications concerning usage of devices and shutdowns of devices, (iv) permissions given to different members of the household (e.g., whether children are allowed to use the stove), (v) if an appliance will be shut down automatically or not shut down automatically and instead send warnings to users, (vi) how many warnings were sent to users, (vii) how many warnings were sent to users before an appliance was turned off or shut down, and (viii) whether users are receiving notifications or warnings on mobile devices.

The collected data may be used to improve safety. In addition to the data described above, data regarding actual emergencies may also be collected, such as fires in buildings and the causes of the fires. By collecting a large amount of data, likely causes of dangerous situations may be determined. Users who use their appliances in dangerous ways (e.g., a lot of unattended use) or who have overly permissive settings may be informed that their actions are risky and that they should change their behavior to decrease the likelihood of a dangerous situation. The collected data may also be used to assist in determining the actual cause of an emergency, such as a fire.

In some implementations, the collected data may be provided to an insurance company (e.g., home owner's insurance) to determine a risk profile for the home. After determining a risk profile, the insurance company may adjust the insurance premium for the building so that it is commensurate with risk caused by the appliance usage in the home.

In some implementations, the data collected may be provided to a food processing or delivery company to improve their services to individuals and homes. For example, a food processing or delivery company can try to predict how meals in a certain zip code or area are cooked. For example, if homeowners cook for greater than an average of 15 minutes, they may predominately use fresh ingredients while if homeowners cook for an average of less than 5 minutes, they may be cooking processed food or other types of quickly prepared meals. The collected data may also be used to determine information about the kinds of cooking done by homeowners. For example, data from a microphone or infrared sensor may be analyzed to determine that in some areas, frying is more popular than baking or boiling. A food and/or delivery company could use this information to better target customers. In another example, the collected data may include a time of day that cooking usually occurs and a location. This information may allow local restaurants or advertisements to be targeted at the appropriate time (e.g. present a local restaurant or delivery coupon 30 minutes before expected cooking time).

In some implementations, the collected data may be used for marketing and/or advertising, such as targeted advertising. The collected data may be provided to third parties to allow the third parties to select users for targeted advertising or to send coupons to the user. The third party could provide the advertising using any known techniques, such as direct mail or online. For example, for a person who does a lot of cooking or who cooks fancier meals, a company that sells high quality cookware may want to target that person. For a person who does very little cooking or for very short cooking times, a company that does food delivery way want to target that person. The companies may bid on sending advertisements to a person in a similar manner that companies make bids for keyword advertising. For example, multiple cookware companies may bid to provide advertisements to people who cook on average more than one hour a day, and the highest bidders may obtain the rights to send an advertisement to those people.

In some implementations, rewards may be provided to users based on continued usage of an appliance. For example, a reward may be provided to a user for reaching a threshold for the number of times using an appliance or a total amount of time for using an appliance. The rewards could include a virtual promotion to a certain status, a badge that is presented online, such as on a social media website, or a coupon provided by a third party. For example, after a person has used their stove 50 times, a local restaurant may send that person a coupon so that they can eat out instead of cooking one night.

Implementation

The system and techniques described above therefore comprise technological improvements to several underlying technologies, including (among others): the technology of back-and-forth communication between two devices through a communication network to enable a user of one of the devices to manage operation of an application on the other of the devices; the technology of providing features in a user interface that are presented to a user of a device, based on information specified by a user of a second device; the technology of providing features in a user interface that help a user of a device to coach a user of another device by means of information and commands sent from the first device to the second device. The technological improvements include (among others) enhancing a user interface at one or both of the devices to provide additional and modified features based on information and commands sent through a communication network between the first device and the second device; providing information through a communication network to a user of one of the devices that help the user in controlling the application running on the other device; providing features of the user interface on the other of the devices that enhance the familiarity, comfort, and fluidity of the interaction by a user of the other device; and providing for selected, timed and choreographed communication back and forth between the two devices that facilitates real-time or near real-time virtual interaction between users of the two devices.

Depending on the implementation, steps of any of the techniques described above may be performed in a different sequence, may be combined, may be split into multiple steps, or may not be performed at all. The steps may be performed by a general purpose computer, may be performed by a computer specialized for a particular application, may be performed by a single computer or processor, may be performed by multiple computers or processors, may be performed sequentially, or may be performed simultaneously.

The techniques described above may be implemented in hardware, in software, or a combination of hardware and software. The choice of implementing any portion of the above techniques in hardware or software may depend on the requirements of a particular implementation. A software module or program code may reside in volatile memory, non-volatile memory, RAM, flash memory, ROM, EPROM, or any other form of a non-transitory computer-readable storage medium.

Conditional language used herein, such as, "can," "could," "might," "may," "e.g.," is intended to convey that certain implementations include, while other implementations do not include, certain features, elements and/or steps. Thus, such conditional language indicates that that features, elements and/or steps are not required for some implementations. The terms "comprising," "including," "having," and the like are synonymous, used in an open-ended fashion, and do not exclude additional elements, features, acts, operations. The term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood to convey that an item, term, etc. may be either X, Y or Z, or a combination thereof. Thus, such conjunctive language is not intended to imply that certain embodiments require at least one of X, at least one of Y and at least one of Z to each be present.

While the above detailed description has shown, described and pointed out novel features as applied to various implementations, it can be understood that various omissions, substitutions and changes in the form and details of the devices or techniques illustrated may be made without departing from the spirit of the disclosure. The scope of inventions disclosed herein is indicated by the appended claims rather than by the foregoing description. All changes which come within the meaning and range of equivalency of the claims are to be embraced within their scope.

What is claimed is:

1. An electric range comprising:
    a first burner of a stove;
    a second burner of the stove;
    an oven;
    a first sensor that indicates electrical usage by the first burner;
    a second sensor that indicates electrical usage by the second burner;
    a third sensor that indicates electrical usage by a heating element of the oven;
    a fourth sensor that indicates temperature proximate to the first burner;
    a fifth sensor that indicates temperature proximate to the second burner;
    a sixth sensor that indicates temperature proximate to the oven; and
    a control board configured to:
        receive measurements from each of the first sensor, the second sensor, the third sensor, the fourth sensor, the fifth sensor, and the sixth sensor,
        turn off at least one of the first burner, the second burner, or the oven based at least in part on processing the received measurements, and
        send a message to a second device with information about a state of the electric range or instructions to modify a setting of the second device.

2. The electric range of claim 1, further comprising:
    a seventh sensor that detects a position of a door to the oven; and
    wherein the control board is further configured, based at least in part on a measurement from the seventh sensor, to (i) modify a temperature setting of the oven or (ii) turn off the oven.

3. An electric range comprising:
    a first burner of a stove;
    a second burner of the stove;
    an oven;
    a first sensor that indicates electrical usage by the first burner;
    a second sensor that indicates electrical usage by the second burner;
    a third sensor that indicates electrical usage by a heating element of the oven;
    a fourth sensor that indicates temperature proximate to the first burner;
    a fifth sensor that indicates temperature proximate to the second burner;
    a sixth sensor that indicates temperature proximate to the oven;
    a seventh sensor that detects a position of a door to the oven; and
    a control board configured to:
        receive measurements from each of the first sensor, the second sensor, the third sensor, the fourth sensor, the fifth sensor, and the sixth sensor,
        turn off at least one of the first burner, the second burner, or the oven based at least in part on processing the received measurements, and based at least in part on a measurement from the seventh sensor, to (i) modify a temperature setting of the oven or (ii) turn off the oven.

4. The electric range of claim 1 or 3, further comprising:
a wireless network interface to communicate with an external sensor; and
wherein the control board is further configured to:
  receive a measurement from the external sensor via the wireless network interface, and
  turn off at least one of the first burner, the second burner, or the oven based at least in part on the measurement from the external sensor.

5. The electric range of claim 1 or 3, wherein the control board is further configured to:
obtain instructions regarding a sequence of operations for controlling at least one of the first burner, the second burner, or the oven; and
implement the instructions.

6. The electric range of claim 3, wherein the control board is further configured to send a message to a second device with information about a state of the electric range or instructions to modify a setting of the second device.

7. A gas range comprising:
a first burner of a stove;
a second burner of the stove;
an oven;
a first sensor that indicates gas usage by the first burner;
a second sensor that indicates gas usage by the second burner;
a third sensor that indicates gas usage by a heating element of the oven;
a fourth sensor that indicates temperature proximate to the first burner of the stove;
a fifth sensor that indicates temperature proximate to the second burner of the stove;
a sixth sensor that indicates temperature proximate to the oven; and
a control board configured to:
  receive measurements from each of the first sensor, the second sensor, the third sensor, the fourth sensor, the fifth sensor, and the sixth sensor,
  turn off at least one of the first burner, the second burner, or the oven based at least in part on processing the received measurements, and
  send a message to a second device with information about a state of the gas range or instructions to modify a setting of the second device.

8. The gas range of claim 7, further comprising:
a seventh sensor that detects a position of a door to the oven; and
wherein the control board is further configured, based at least in part on a measurement from the seventh sensor, to (i) modify a temperature setting of the oven or (ii) turn off the oven.

9. A gas range comprising:
a first burner of a stove;
a second burner of the stove;
an oven;
a first sensor that indicates gas usage by the first burner;
a second sensor that indicates gas usage by the second burner;
a third sensor that indicates gas usage by a heating element of the oven;
a fourth sensor that indicates temperature proximate to the first burner of the stove;
a fifth sensor that indicates temperature proximate to the second burner of the stove;
a sixth sensor that indicates temperature proximate to the oven;
a seventh sensor that detects a position of a door to the oven; and
a control board configured to:
  receive measurements from each of the first sensor, the second sensor, the third sensor, the fourth sensor, the fifth sensor, and the sixth sensor,
  turn off at least one of the first burner, the second burner, or the oven based at least in part on processing the received measurements, and
  based at least in part on a measurement from the seventh sensor, to (i) modify a temperature setting of the oven or (ii) turn off the oven.

10. The gas range of claim 7 or 9, further comprising:
a wireless network interface to communicate with an external sensor; and
wherein the control board is further configured to:
  receive a measurement from the external sensor via the wireless network interface, and
  turn off at least one of the first burner, the second burner, or the oven based at least in part on the measurement from the external sensor.

11. The gas range of claim 7 or 9, wherein the control board is further configured to:
obtain instructions regarding a sequence of operations for controlling at least one of the first burner, the second burner, or the oven; and
implement the instructions.

12. The gas range of claim 9, wherein the control board is further configured to send a message to a second device with information about a state of the gas range or instructions to modify a setting of the second device.

* * * * *